US012597006B1

(12) United States Patent
Cohn et al.

(10) Patent No.: US 12,597,006 B1
(45) Date of Patent: Apr. 7, 2026

(54) CUSTOMIZED RETAIL ENVIRONMENTS

(71) Applicant: Amazon Technologies, Inc., Seattle, WA (US)

(72) Inventors: Jonathan E. Cohn, Acton, MA (US); Ejaz Ahmed, Marlborough, MA (US); Gregory Hager, Baltimore, MD (US)

(73) Assignee: Amazon Technologies, Inc., Seattle, WA (US)

( * ) Notice: Subject to any disclaimer, the term of this patent is extended or adjusted under 35 U.S.C. 154(b) by 341 days.

(21) Appl. No.: 17/004,785

(22) Filed: Aug. 27, 2020

(51) Int. Cl.
G06Q 20/00 (2012.01)
G06N 7/01 (2023.01)
G06Q 20/20 (2012.01)

(52) U.S. Cl.
CPC ............. *G06Q 20/208* (2013.01); *G06N 7/01* (2023.01); *G06Q 20/201* (2013.01); *G06Q 20/203* (2013.01)

(58) Field of Classification Search
CPC .... G06Q 20/208; G06Q 10/087; G06Q 30/02; G06Q 20/20; G06Q 20/18; G06Q 30/06; G01G 19/393; G01G 19/52
See application file for complete search history.

(56) References Cited

U.S. PATENT DOCUMENTS

| | | | | | |
|---|---|---|---|---|---|
| 1,055,281 | A | * | 3/1913 | Klefsaas | B66C 1/34 294/75 |
| 6,794,586 | B1 | * | 9/2004 | Mason | G01G 19/4144 235/383 |
| 7,416,119 | B1 | * | 8/2008 | Inderrieden | G07G 1/14 235/383 |
| 7,837,103 | B2 | * | 11/2010 | Suto | G01G 19/414 235/383 |
| 9,117,106 | B2 | | 8/2015 | Dedeoglu et al. | |
| 9,235,928 | B2 | | 1/2016 | Medioni et al. | |
| 9,473,747 | B2 | | 10/2016 | Kobres et al. | |
| 10,266,196 | B1 | * | 4/2019 | Sinha | B62B 3/008 |
| 11,741,447 | B1 | * | 8/2023 | Matheson | G06Q 20/208 705/21 |
| 11,783,682 | B2 | * | 10/2023 | Zalewski | G07G 1/0072 705/26.8 |
| 2006/0038007 | A1 | * | 2/2006 | Dickover | A47F 9/046 235/383 |
| 2013/0284806 | A1 | | 10/2013 | Margalit | |
| 2014/0338987 | A1 | * | 11/2014 | Kobres | G01G 19/4144 177/1 |

(Continued)

*Primary Examiner* — Florian M Zeender
*Assistant Examiner* — Milena Racic
(74) *Attorney, Agent, or Firm* — Athorus, PLLC

(57) ABSTRACT

This disclosure describes, in part, systems for enabling facilities to implement techniques to identify items using weight sensors. For instance, a first weight sensor may determine a first weight associated with a first item, where the first item is priced per unit weight. The first weight sensor may be located within an inventory location associated with the item or a station that weighs and prices items. A second weight sensor may then determine a second weight of a second item. The second weight sensor may be located within the station or a tote, such as a shopping cart. A system may then use the second weight and the first weight to determine that the second item includes the first item. In some instances, the system may also use locations of the weight sensors, a time of flight of the item, and/or other information to make the determination.

19 Claims, 12 Drawing Sheets

(56)          References Cited

U.S. PATENT DOCUMENTS

| | | | |
|---|---|---|---|
| 2014/0351265 A1* | 11/2014 | Beaurepaire | G06F 17/15 707/748 |
| 2015/0039458 A1* | 2/2015 | Reid | A61B 5/117 705/26.1 |
| 2016/0109281 A1* | 4/2016 | Herring | G06Q 30/0235 177/1 |
| 2020/0118401 A1* | 4/2020 | Zalewski | G06Q 30/0633 |
| 2020/0184442 A1* | 6/2020 | Gu | G06Q 20/208 |
| 2021/0049772 A1* | 2/2021 | Buibas | G06Q 30/0601 |
| 2021/0335104 A1* | 10/2021 | Karol | H04W 4/80 |
| 2022/0207504 A1* | 6/2022 | Andronic | G06Q 20/208 |
| 2022/0299249 A1* | 9/2022 | Boyte | F25D 23/12 |

* cited by examiner

700

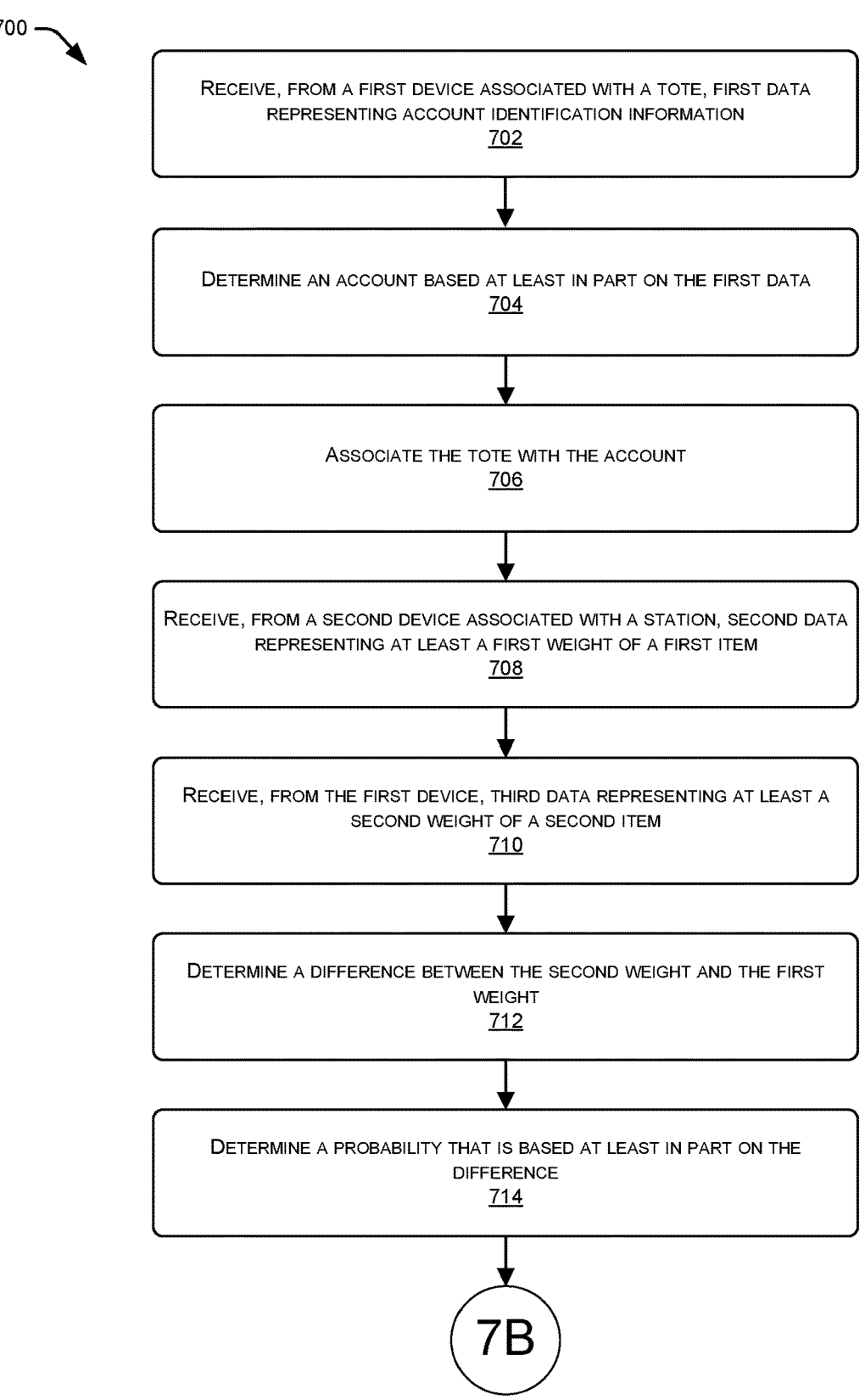

RECEIVE, FROM A FIRST DEVICE ASSOCIATED WITH A TOTE, FIRST DATA REPRESENTING ACCOUNT IDENTIFICATION INFORMATION
702

DETERMINE AN ACCOUNT BASED AT LEAST IN PART ON THE FIRST DATA
704

ASSOCIATE THE TOTE WITH THE ACCOUNT
706

RECEIVE, FROM A SECOND DEVICE ASSOCIATED WITH A STATION, SECOND DATA REPRESENTING AT LEAST A FIRST WEIGHT OF A FIRST ITEM
708

RECEIVE, FROM THE FIRST DEVICE, THIRD DATA REPRESENTING AT LEAST A SECOND WEIGHT OF A SECOND ITEM
710

DETERMINE A DIFFERENCE BETWEEN THE SECOND WEIGHT AND THE FIRST WEIGHT
712

DETERMINE A PROBABILITY THAT IS BASED AT LEAST IN PART ON THE DIFFERENCE
714

700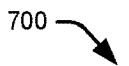
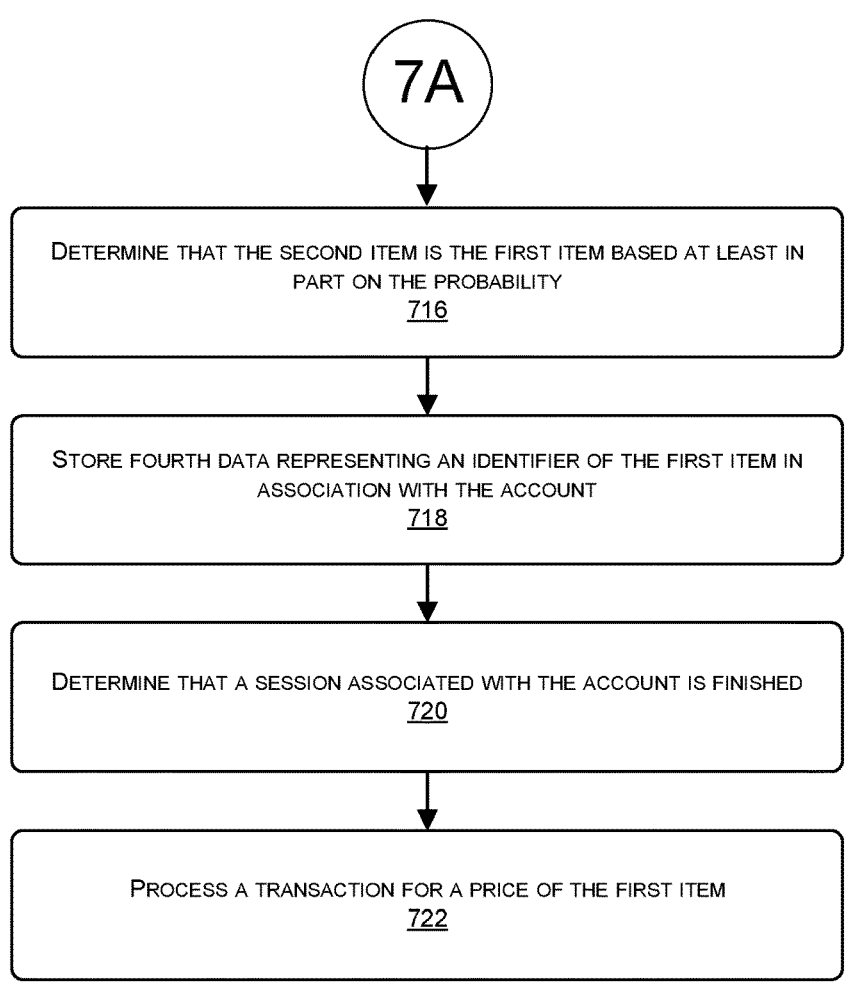
DETERMINE THAT THE SECOND ITEM IS THE FIRST ITEM BASED AT LEAST IN PART ON THE PROBABILITY
716
STORE FOURTH DATA REPRESENTING AN IDENTIFIER OF THE FIRST ITEM IN ASSOCIATION WITH THE ACCOUNT
718
DETERMINE THAT A SESSION ASSOCIATED WITH THE ACCOUNT IS FINISHED
720
PROCESS A TRANSACTION FOR A PRICE OF THE FIRST ITEM
722
FIG. 7B

800 ⟍

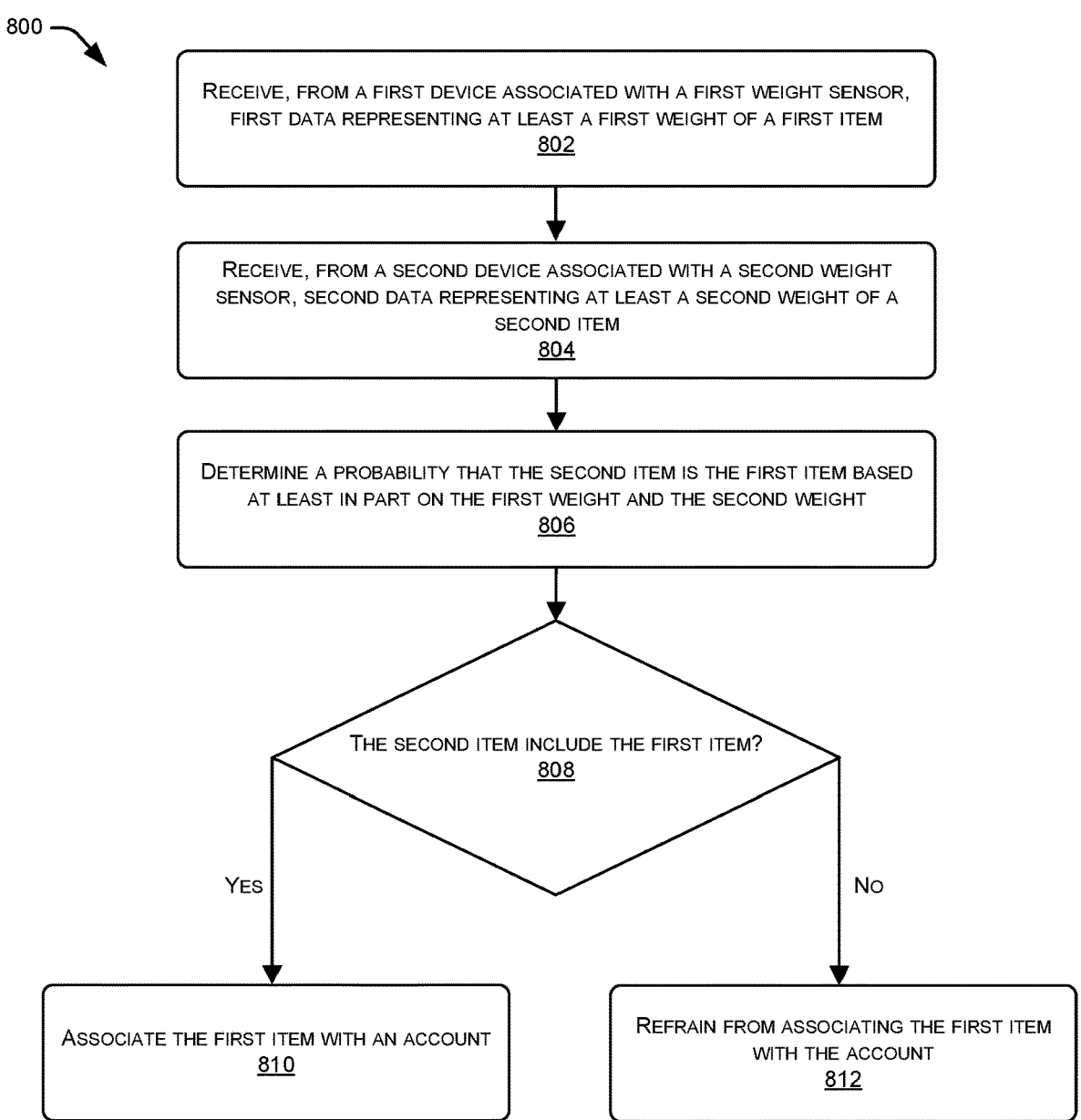

RECEIVE, FROM A FIRST DEVICE ASSOCIATED WITH A FIRST WEIGHT SENSOR, FIRST DATA REPRESENTING AT LEAST A FIRST WEIGHT OF A FIRST ITEM
802

RECEIVE, FROM A SECOND DEVICE ASSOCIATED WITH A SECOND WEIGHT SENSOR, SECOND DATA REPRESENTING AT LEAST A SECOND WEIGHT OF A SECOND ITEM
804

DETERMINE A PROBABILITY THAT THE SECOND ITEM IS THE FIRST ITEM BASED AT LEAST IN PART ON THE FIRST WEIGHT AND THE SECOND WEIGHT
806

THE SECOND ITEM INCLUDE THE FIRST ITEM?
808

YES                                              NO

ASSOCIATE THE FIRST ITEM WITH AN ACCOUNT
810

REFRAIN FROM ASSOCIATING THE FIRST ITEM WITH THE ACCOUNT
812

FIG. 8

900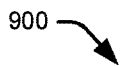

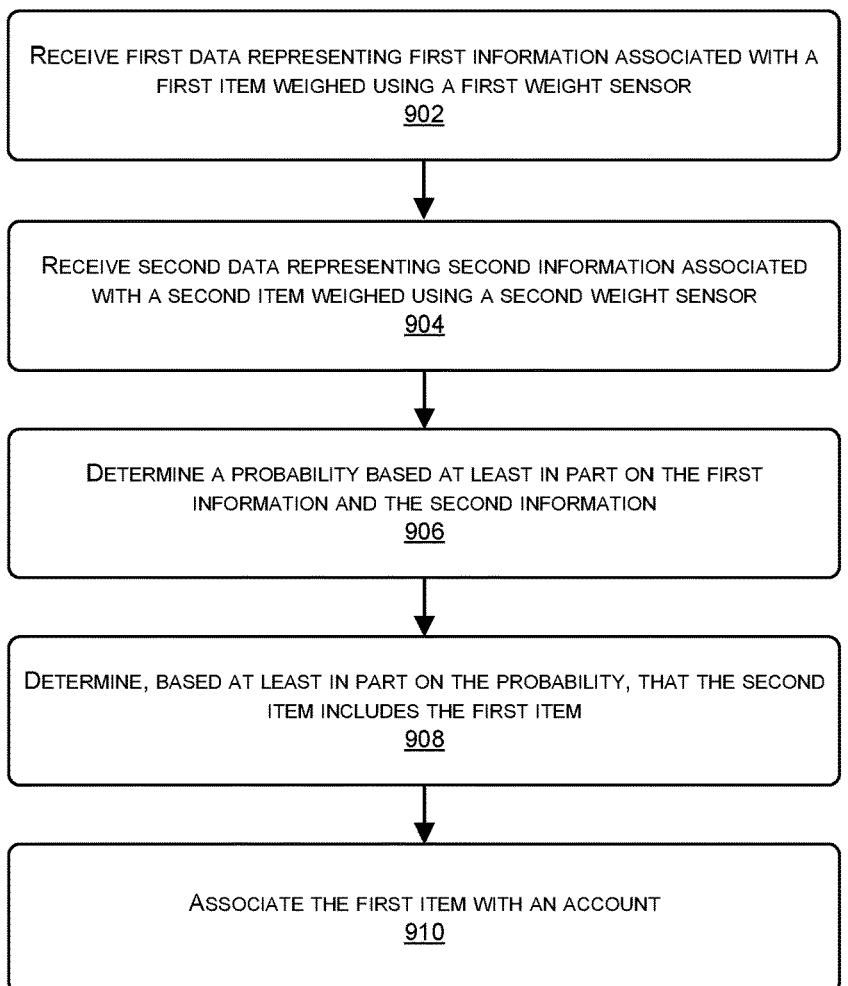

RECEIVE FIRST DATA REPRESENTING FIRST INFORMATION ASSOCIATED WITH A FIRST ITEM WEIGHED USING A FIRST WEIGHT SENSOR
902

RECEIVE SECOND DATA REPRESENTING SECOND INFORMATION ASSOCIATED WITH A SECOND ITEM WEIGHED USING A SECOND WEIGHT SENSOR
904

DETERMINE A PROBABILITY BASED AT LEAST IN PART ON THE FIRST INFORMATION AND THE SECOND INFORMATION
906

DETERMINE, BASED AT LEAST IN PART ON THE PROBABILITY, THAT THE SECOND ITEM INCLUDES THE FIRST ITEM
908

ASSOCIATE THE FIRST ITEM WITH AN ACCOUNT
910

FIG. 9

CUSTOMIZED RETAIL ENVIRONMENTS

BACKGROUND

Traditional physical stores maintain an inventory of items in customer-accessible areas such that customers can pick items from the inventory and take them to a cashier for purchase, rental, and so forth. For example, a customer may take an item, such as oranges, from a shelf located within the store. The customer may then take the oranges to a cashier that is located near an entrance of the store. Using a point-of-sale device, the cashier may weigh the oranges and then process a transaction for a price of the oranges, where the price is based on the weight. For example, the cashier may input payment information, such as a card number, into the point-of-sale device, which may charge the card of the customer for the price of the oranges.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 7A-7B are an example process for using sensor data representing weights of items in order to identify and associate an item with an account of a user.

FIG. 8 is an example process for using sensor data representing weights to identify an item within a facility.

FIG. 9 is an example process for using information about items weighed using weight sensors in order to identify an item.

DETAILED DESCRIPTION

Figure 1:
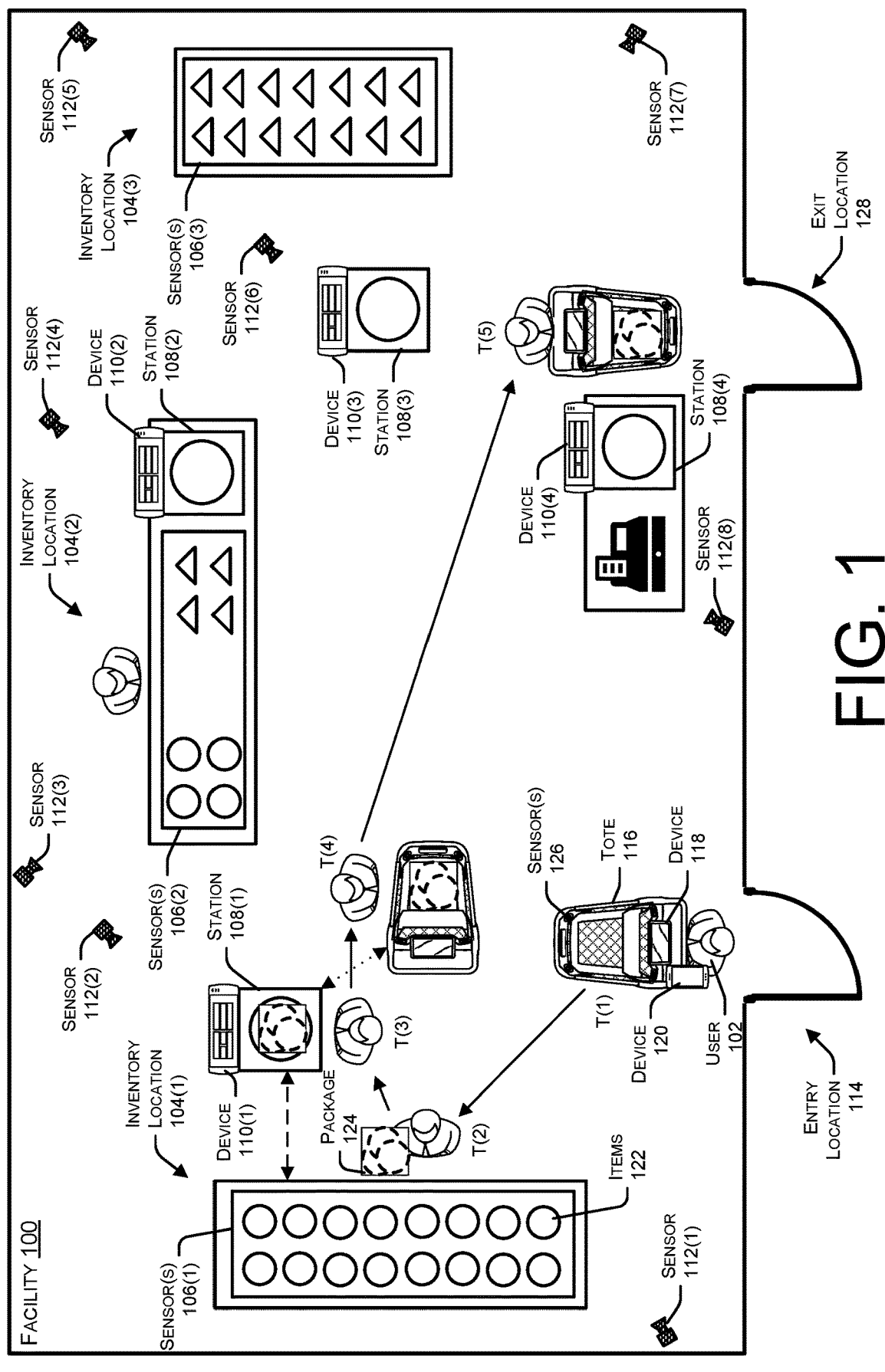
FIG. 1 illustrates an example facility associated with a system for enabling automated checkout (AC) techniques to allow users to enter the facility, remove items that are located at inventory locations within the facility, and exit the facility without performing a manual checkout of the items. In the example of FIG. 1, the system uses item weights to identify an item that a user removes from an inventory location, weighs using a station, and then places within a tote.

This disclosure describes, in part, systems for enabling facilities (e.g., physical retail stores) to implement technology that is able to automatically determine items that users possess when exiting the facilities. By using this technology, the users are able to pick items from inventory locations (e.g., shelves, racks, cases, cabinets, bins, floor locations, etc.) and exit the facilities without performing manual checkout. For instance, a system may use sensors located within a facility, such as weight sensors, to determine weights of items removed from inventory locations, weights of items placed on scales located within the facility, weights of items placed within totes (e.g., shopping carts), and/or weights of items placed on checkout locations. The system may then use these weights, along with other sensor data, to determine which users were in possession of item(s) when exiting the facility. Using these determinations, the system may associate identifiers of the items with accounts of the users. Additionally, the system may use payment information, which may be stored in association with the accounts, to automatically process transactions for the prices of the items (e.g., process the transactions without manual checkout).

For more details, a user may enter the facility and use a tote to remove item(s) from inventory location(s) within the facility. The system may associate the tote with the user and use the association to identify one or more of the item(s) removed by the user. For example, an electronic device (which may be referred to, in these examples, as a "first electronic device") attached to the tote may receive information associated with the account of the user. The information may include, but is not limited to, an identifier (e.g., a user name, a name, etc.), a password, payment information, a code (e.g., a Quick Response (QR) code, etc.), biometric information, and/or any other type of information that the system may use to identify the account. In some instances, the first electronic device receives the information from a user device in possession of the user. Additionally, or alternatively, in some instances, the user inputs the information into the first electronic device. In either of the instances, the first electronic device may then send the account identification data representing the information to the system. Using the account identification data, the system may identify the account of the user and associate the account with the tote.

The user may then remove the item(s) from the inventory location(s) and place the item(s) within the tote. Using sensor data and the association between the account and the tote, the system may identify the item(s) being placed within the tote by the user. For example, the user may remove, from an inventory location, an item that is priced per unit weight. In some instances, the inventory location may include one or more sensors, such as a weight sensor, that determines the weight of the item removed from the inventory location. The system may then receive, from an electronic device (which may be referred to, in these examples, as a "second electronic device") associated with the inventory location, sensor data representing a weight (referred to, in these examples, as a "first weight") associated with the item as removed from the inventory location. In some instances, the system may then determine that the item includes an "in-flight" item. As described herein, the system may determine that items include in-flight items until the system identifies which user within the facility removed the items and/or associates the items with accounts of the identified users.

Since the item is priced per unit weight, the user may take the item to a station in order to weigh the item and determine the price. For instance, the station may include a weight sensor (e.g., scales) that is used to determine weights of items placed on the station. For example, the weight sensor may include a Legal for Trade (LFT) certified scale. The station may further include an electronic device (which may be referred to, in these examples, as a "third electronic device") that provides information to the user that is weighing the item. The information may include, but is not limited to, an identity of the item that is placed on the weight sensor, the price per unit weight of the item, a weight (referred to, in these examples, as a "second weight") associated with the item as determined using the station, the total price of the item (which is based on the second weight), and/or the like. After weighting the item, the third electronic device may send data to the system. The data may represent the identity of the item, the second weight associated with the item, the price of the item, and/or other information associated with the item.

In some instances, the system may determine the identity of the item that the user weighed using the station. For example, while the user is weighing the item and/or after the user weighs the item, the system may receive the data from the third electronic device. The system may then analyze the data to determine the second weight associated with the item placed on the weight sensor and compare the second weight to weight(s) of item(s) that are in-flight when the item was placed on the weight sensor (e.g., at least the first weight associated with the item). Based on the comparison, the system may identify which item, from the in-flight item(s), was placed on the weight sensor of the station.

For example, the system may determine difference(s) between the second weight associated with the item and the weight(s) of the in-flight item(s). The system may then determine a respective probability for each in-flight item using the determined difference(s). In some instances, the system determines greater probabilities for in-flight item(s) that are associated with smaller differences and smaller probabilities for in-flight item(s) that are associated with larger differences. For example, if the system determines that a first difference for a first in-flight item is 0.1 pounds and a second difference for a second in-flight item is 2 pounds, then the system may determine that a first probability (e.g., 99%) that the item weighed using the station includes the first in-flight item is greater that a second probability (e.g., 2%) that the item weighed using the station includes the second in-flight item.

The system may use one or more different techniques (e.g., one or more algorithms) when determining the probabilities. For example, the system may use an algorithm that sets a high probability (e.g., 100%) for an in-flight item when the weight of the in-flight item is equal to the second weigh associated with the item. The algorithm may then decrease the probability as the difference between the weight of the in-flight item and the second weight associated with the item increases. In some instances, the decrease in the probability is linear. However, in other examples, the decrease in the probability may not be linear. While this is just one example algorithm that the system may use to determine the probabilities, in other examples, the system may use any other type of algorithm.

Additionally, or alternatively, in some instances, the system may assume that each item is characterized by a Gaussian distribution with a mean and variance. The mean and variance could set based on manufacturer specification of the accuracy of the scale, or could be determined empirically through offline testing or online learning of the accuracy. The distribution may also be other distributions (e.g. from the exponential family), or it may be an empirical distribution (e.g. a histogram of weight differences). In some instances, for any given determination as to whether the item is the same item or a different item, the probability that this determination is in error can be calculated from the distributions and used as a way to establish both the most likely determination and/or whether the probability of that determination exceeds a threshold, as discussed above. For example, if weights are represented by Gaussian distributions, the difference between weights is a chi-square distribution and the probability that the two weights correspond to the same item can be looked up from tabulations of the chi-square distribution probabilities.

In some instances, the system may then use the probabilities to identify which in-flight item was weighed using the station (e.g., the item removed from the inventory location that is associated with the first weight). For a first example, the system may identify the in-flight item based on the probability associated with the in-flight item satisfying (e.g., being equal to or greater than) a threshold probability. As described herein, a threshold probability may include, but is not limited to, 95%, 98%, 99%, 99.9%, and/or any other probability. For instance, and using the example above, the system may determine that the item weighed using the station includes the first in-flight item based on the first probability (e.g., 99%) satisfying a threshold probability (e.g., 95%). For a second example, the system may identify the in-flight item based on the probability associated with the in-flight item including the greatest probability of all of the in-flight items at the time the item was weighed using the station. For instance, and again using the example above, the system may determine that the item weighed using the station includes the first in-flight item based on the first probability (e.g., 99%) associated with the first in-flight item being greater than the second probability (e.g., 2%) associated with the second in-flight item.

Next, after weighting the item using the station, the user may remove the item from the station and place the item within the tote. The first electronic device associated with the tote may then use a weight sensor included within the tote to determine a weight (which may be referred to, in these examples, as a "third weight") associated with the item. Additionally, after determining the third weight, the system may receive sensor data from the first electronic device, where the sensor data represents at least the third weight associated with the item. The system may then use the third weight to identify which item the user placed within the tote.

For example, the system may analyze the sensor data to determine the third weight associated with the item placed within the tote. The system may then compare the third weight associated with the item to weight(s) of item(s) that were in-flight when the item was placed within the tote. In some instances, the weight(s) of the item(s) that were in-flight were determined using the station(s) located within the facility. Additionally, or alternatively, in some instances, the weight(s) of the item(s) that were in-flight were determined using the sensors associated with the inventory location(s) at which the item(s) were removed. In either of the instances, and based on the comparison, the system may identify which item, from the in-flight item(s), was placed within the tote.

For example, the system may determine difference(s) between the third weight of the item placed within the tote and the weight(s) of the in-flight item(s). The system may then determine a respective probability for each in-flight item using the determined difference. In some instances, and similar to the probabilities described above, the system determines greater probabilities for in-flight item(s) that are associated with smaller differences and smaller probabilities for in-flight item(s) that are associated with larger differences. For example, if the system determines that a first difference for a first in-flight item is 0.3 pounds and a second difference for a second in-flight item is 3 pounds, then the system may determine that a first probability (e.g., 97%) that the item placed within the tote includes the first in-flight item is greater that a second probability (e.g., 1%) that the item placed within the tote includes the second in-flight item.

In some instances, the system may then use the probabilities to identify which in-flight item was placed within the tote. For a first example, the system may identify the in-flight item based on the probability associated with the in-flight item satisfying (e.g., being equal to or greater than) a threshold probability. For instance, and using the example above, the system may determine that the item placed within the tote includes the first in-flight item based on the first probability (e.g., 98%) satisfying a threshold probability (e.g., 95%). For a second example, the system may identify the in-flight item based on the probability associated with the in-flight item including the greatest probability of all of the in-flight items at the time the item was placed within the tote. For instance, and again using the example above, the system may determine that the item placed within the tote includes the first in-flight item based on the first probability (e.g., 98%) associated with the first in-flight item being greater than the second probability (e.g., 1%) associated with the second in-flight item. In either example, the system may then store data associated with the item in association with the account of the user. For example, the data may represent at least the identifier of the item, the second weight of the item, the price per unit weight of the item (which may be determined using the second weight), and/or the total price of the item.

In some instances, the system may use additional and/or alternative information when identifying the item weighed using the station and/or identifying the item placed within the tote. For instance, the system may determine a location associated with the inventory location for which the item was removed, a location associated with the station, and/or a location associated with the tote (e.g., when the item was weighed using the station and/or when the item was placed within the tote). The system may then use one or more of these locations when determining the probabilities described above.

For a first example of using the locations to identify items, the system may determine a distance between a location associated with an inventory location for which an in-flight item was removed and the location associated with the station. The system may then use the distance when determining the probability that is associated with the in-flight item including the item that was weighed using the station. For instance, the system may increase the probability when the distance is small and decrease the probability when the distance is large. This may be because the system assumes that the user is going to use a station that is in close proximity to the inventory location for which the item was removed. The system may then perform similar processes when determining the probability(ies) of each of the other in-flight item(s) within the facility.

For a second example of using the locations to identify items, the system may determine a distance between a location associated with station for which the in-flight item was weighed and the location associated with the tote. The system may then use the distance when determining the probability that is associated with the in-flight item including the item that was placed within the tote. For example, the system may increase the probability when the distance is small and decrease the probability when the distance is large. This may be because the system assumes that the tote will be located in close proximity to the station for which the user is weighing the item. The system may then perform similar processes when determining the probability(ies) of each of the other in-flight item(s) within the facility.

In some instances, the system may additionally and/or alternatively use time(s) at which the item(s) were in-flight when identifying item(s). For a first example of using the times to identify items, the system may determine a time difference between a time at which an in-flight item was removed from an inventory location and a time at which the item was weighed using the station. The system may then use the time difference when determining the probability that is associated with the in-flight item including the item that was weighed using the station. For example, the system may increase the probability when the time difference is small and decrease the probability when the time difference is large. This may be because the system assumes that the user is going to weigh the item soon after removing the item from the inventory location. The system may then perform similar processes when determining the probability(ies) of each of the other in-flight item(s) within the facility.

For a second example of using the times to identify items, the system may determine a time difference between a time at which an in-flight item was weighed using the station and/or removed from the station and a time at which the item was placed within the tote. The system may then use the time difference when determining the probability that is associated with the in-flight item including the item that was placed within the tote. For example, the system may increase the probability when the time difference is small and decrease the probability when the time difference is large. This may be because the system assumes that the user is going to place the item within the tote soon after weighing the item using the station. The system may then perform similar processes when determining the probability(ies) of each of the other in-flight item(s) within the facility.

In some instances, the system may additionally and/or alternatively use package(s) associated with in-flight item(s) when identifying item(s). As described herein, a package may include, but is not limited to, a bag, a box, a case, a wrapping, and/or any other object that is capable of holding and/or securing items. In some instances, inventory locations are associated with unique packages that the system is able to analyze to identify the items. For example, a first inventory location may be associated with a first type of package (e.g., red packages) while a second inventory location is associated with a second type of package (e.g., green packages). Additionally, or alternatively, in some instances, an inventory location may be associated with multiple packages that the system is able to analyze to identify items. For example, the inventory location may include a roll of bags, where every other bag (and/or every fifth bag, tenth bag, etc.) includes a unique color and/or design.

For a first example of using packages to identify items, the system may receive first image data generated by a first imaging device, where the first image data represents an area that includes the inventory location. The system may then analyze the first image data to determine one or more first characteristics associated with a package that was used by the user for security the item. As described herein, a characteristic may include, but is not limited to, a size, a color, a shape, a design, a texture, a logo, a marking, and/or any other characteristic. Next, the system may receive second image data generated by the first imaging device or a second imaging device, where the second image data represents an area that includes the station. The system may then analyze the second image data to determine one or more second characteristics associated with a package that was placed on the weight sensor when weighing the item. Using the one or more first characteristics and the one or more second characteristics, the system may (1) update the probability and/or (2) determine that the package that was used by the user for securing item includes the same package that was placed on the weight sensor when weighing the item. In some instances, using this determination, the system may determine that the item placed within the package is the same item being weighed by the user. Additionally, or alternatively, in some instances, using this determination, the system may increase (if the characteristics are similar) or decrease (if the characteristics are not similar) the probability that the in-flight item includes the item that was weighed using the station.

For a second example of using packages to identify items, the system may receive first image data generated by a first imaging device, where the first image data represents an area that includes the station. The system may then analyze the first image data to determine one or more first characteristics associated with a package that was used when weighing the item. Next, the system may receive second image data generated by the first imaging device or a second imaging device, where the second image data represents an area that includes the tote. The system may then analyze the second image data to determine one or more second characteristics associated with a package that was placed within the tote. Using the one or more first characteristics and the one or more second characteristics, the system may (1) update the probability and/or (2) determine that the package that was used to weigh the item is the same package that was placed within the tote. In some instances, using this determination, the system may determine that the item weighed using the station is the same item that was placed within the tote. Additionally, or alternatively, in some instances, using this determination, the system may increase (if the characteristics are similar) or decrease (if the characteristics are not similar) the probability that the item weighed using the station is the same item that was placed within the tote.

As described herein, in some examples, the system may determine that one or more first characteristics are similar to one or more second characteristics when all of the one or more first characteristics are the same as the one or more second characteristics. In such examples, the system may also determine that the one or more first characteristics are not similar to the one or more second characteristics when at least one of the one or more first characteristics is different than then one or more second characteristics. In other examples, the system may determine that one or more first characteristics are similar to one or more second characteristics when at least one of the one or more first characteristics are the same as at least one of the one or more second characteristics. In such examples, the system may determine that the one or more first characteristics are not similar to the one or more second characteristics when all of the one or more first characteristics are different than the one or more second characteristics While the examples above describe identifying an item that is priced per unit weight, in other examples, similar processes may be performed in order to identify other types of items. For example, the user may remove an item that includes a set price from an inventory location, such as a television from a shelf, and place the item within the tote. The system may then receive first sensor data from the inventory location that represents a first weight of the item and second sensor data from the tote that represents a second weight of the item. The system may then perform one or more of the processes descried herein order to identify that it was the item removed from the inventory location that was placed within the tote.

For another example, the user may remove, from an inventory location, item(s) that are priced per unit, such as apples from a shelf, and place the item(s) within the tote. The system may then receive first sensor data from the inventory location that represents a first weight of the item(s) and second sensor data from the tote that represents a second weight of the item(s). The system may then perform one or more of the processes described herein in order to identify that it was the item(s) removed from the inventory location that was placed within the tote and/or the number of item(s) removed from the inventory location and placed within the tote. In some instances, the system may also determine that the same number of item(s) removed from the inventory location match the number of item(s) placed within the tote.

For more detail about the facility, customized retail facilities include inventory locations housing one or more items that may be ordered, received, picked, and/or returned by users. These inventory locations may be associated with one or more sensors configured to generate sensor data indicative of events that occur with respect to the items housed thereupon. For example, these sensors may generate sensor data indicative of a user (and/or associated of the facility) removing an item from the inventory location, returning the item to the inventory location, and/or the like. These sensors may include overhead cameras, in-shelf cameras, weight sensors, and/or any other type of sensor configured to generate sensor data indicative of user interactions with the items. An inventory management system (e.g., the system) may communicate with the sensors in order to receive the sensor data.

In addition, the facility may include, in some instances, one or more entry locations for entering the facility and one or more exit locations for exiting the facility. For example, the facility may include an AC entry location at which an entering user provides information for identifying an account of the user. For instance, the AC entry location may include a scanner or other imaging device at which an entering user scans or otherwise provides a unique code associated with the account of the user, such as a code displayed on a mobile device of the user. Or, the entry location may include a microphone, camera, or other sensor that generates sensor data at the request of the user for use in identifying the account of the user. In still other instances, the AC entry location may include an input device for reading information from a payment card of a user, such as a credit card, debit card, prepaid card, etc. For example, the AC entry location may include a scanner or camera that scans or captures an image of a payment card, a card reader that receives information from a payment card via a swipe, dip, tap, or the like, or may include any other type of input device configured to receive payment or account information.

In some instances, the account of the user may be associated with a payment instrument of the user such that the payment instrument is able to be charged for items procured by the user, with the charge occurring automatically upon exit of the facility by the user and without the user needing to engage in a manual checkout process of the items. Accordingly, the facility may include an AC exit location where an exiting user provides information for identifying an account of the exiting user. The AC exit location may include, similar to the AC entry location, a scanner or other imaging device at which the exiting user scans or otherwise provides a unique code associated with the account of the user, such as the code displayed on the mobile device of the user. Or, the AC exit location may include a microphone, camera, or other sensor that generates sensor data at the request of the user for use in identifying the account of the exiting user.

Note that the facility may also include entry and exit locations at which users may enter and exit without providing identifying information. For instance, users may be allowed access to the facility in a manner similar to a traditional retail facility to allow users to shop or otherwise interact with items at the retail facility without needing to provide information for identifying user accounts. In some examples, the user may be allowed to enter the facility, then provide information for identifying a user account at an ordering location within the facility. Also, at least one exit location may resemble a traditional exit location at a retail facility, including an associate of the facility operating a point of sale (POS) device to manually check out the exiting user, such as an exiting user wishing to pay for items in cash. Of course, it is to be appreciated that the facility may include self-checkout kiosks or any other technology for enabling manual checkout of the items within the facility.

Within this example facility, if a user enters through an AC entry location and provides information identifying an account of the user, or the user enters the facility and provides information identifying the account of the user at an ordering location, then the system associated with the facility may generate a record indicating the presence of the user at the facility. The record may store an indication of the identity of the user, as well as an indication of whether the user is currently eligible to exit the facility (with items procured by the user) via the AC exit location.

Upon finishing his or her shopping, the user may approach the AC exit location and, in some instances, scan or otherwise provide identifying information to enable the system to identify the exiting user. After scanning his or her unique code at the AC exit location, for instance, the user may exit the facility. The system, meanwhile, may thereafter charge an account of the identified exiting user for a price of the items procured by the user within the facility. Of course, while the above example describes the user scanning a unique code (e.g., via a mobile device of the user), it is to be appreciated that the exiting user may be identified based at least in part on other sensor data, such as image data, voice data, or the like.

While some of the examples below are described with reference to a materials handling facility (e.g., a brick-and-mortar retail store, a fulfillment center, etc.), the systems and techniques may be implemented for detecting events in any type of facility, an airport, a classroom, an outdoor environment, an amusement park, or any other location. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 11:
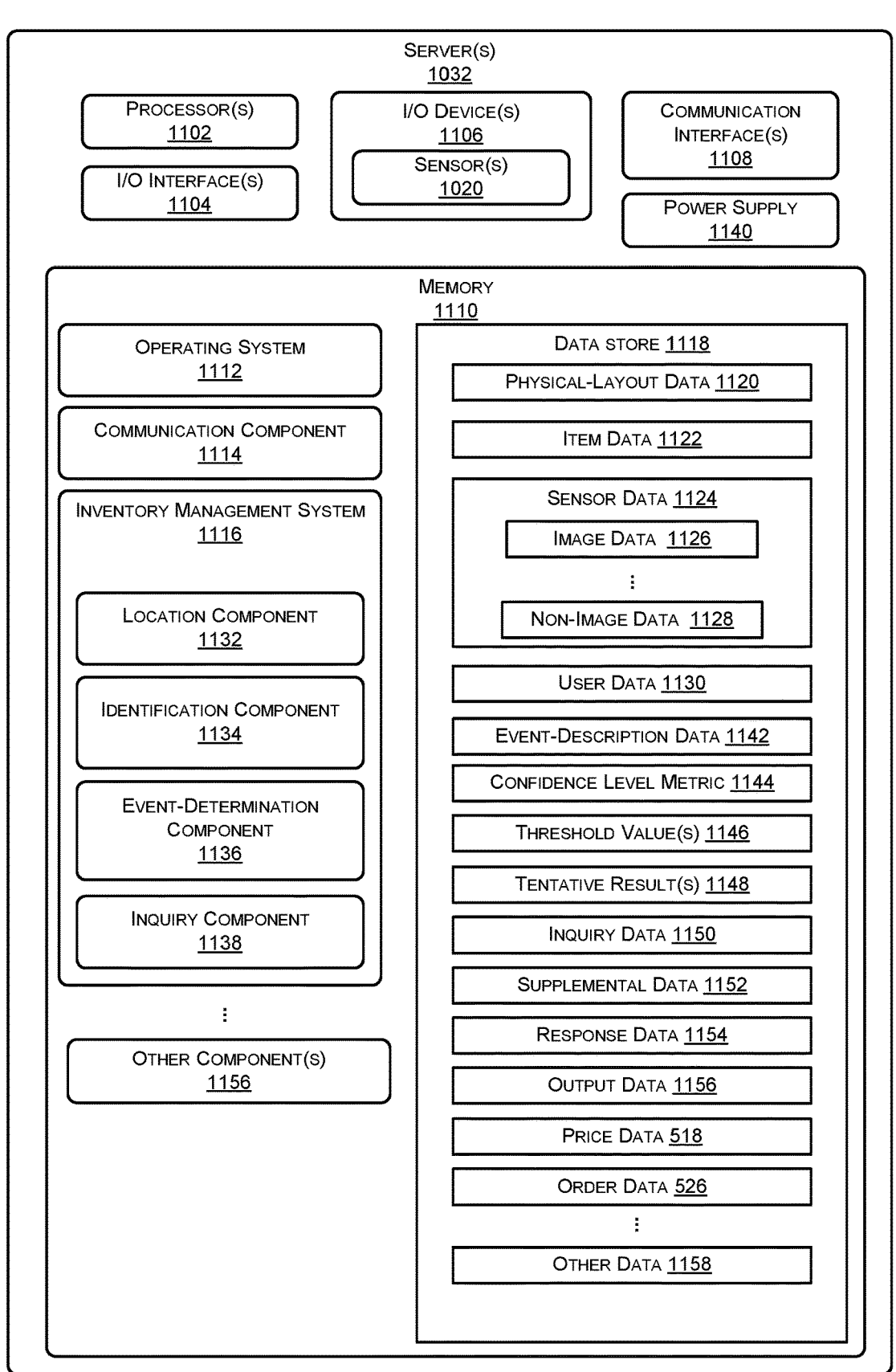
FIG. 11 illustrates a block diagram of one or more servers configured to support operation of the facility. As illustrated, the servers may include a checkout-eligibility component for determining whether a user is eligible to exit the facility with one or more picked items without performing a manual checkout of the items.

Additionally, which examples described herein include the system performing the processing to identify items, in other examples, one or more additional and/or alternative devices may perform at least some of the processing to identify items. For example, the stations (e.g., the devices associated with the stations), the totes (e.g., the devices associated with the totes), and/or any other device may include similar components and/or data as the system (which is represented in FIG. 11). The devices may then perform similar processes as the system in order to identify the items and send data representing the items to the system. In these examples, the devices within the facility may communicate with one another such that the system is not required to receive all of the data, such as the data representing the weights.

Furthermore, while examples describe analyzing image data to identify similarities between packages, in other examples, similar processes may be performed to identify similarities between other types of objects. For example, the system may analyze first image data to identify one or more characteristics associated with a hand of a user and/or objects (e.g., rings) included on the hand of the user. The system may then analyze second image data to identify one or more characteristics associated with another hand of another user and/or other objects included on the other hand. The system may then analyze the one or more first characteristics with respect to the one or more second characteristics in order to identify similarities and/or differences between the one or more first characteristics and the one or more second characteristics. Additionally, the system may use the similarities and/or differences to update the probabilities, using similar processes as the packages described herein.

In some instances, based on the similarities, the system may determine that the same user removed item(s) from one weight sensor and placed the item(s) on another weight sensors. In such instances, the system may use this determination to identify the item(s). For example, the system may determine that since the same user moved the item(s), then the item(s) that were removed by the user are the same item(s) that were placed on the other weight sensor.

FIG. 1 illustrates an example facility 100 associated with a system for enabling automated checkout (AC) techniques to allow users, such as an example user 102, to enter the facility 100, order and/or pick one or more items, and exit the facility without performing a manual checkout of the items. To do so, the system coupled to the environment may identify an account associated with the user 102 and charge the account for a price of the item upon exit from the facility 100.

As illustrated in FIG. 1, the example facility 100 includes inventory locations 104(1)-(3) (also referred to as "inventory locations 104"). In some instances, one or more of the inventory locations 104 provide items that are priced per unit weight of the items. These items may include, but are not limited to, produce, food bar items, bulk food items, pre-portioned items, meats, and/or any other items. As shown, the inventory locations 104 may include sensor 106(1)-(3) (also referred to as "sensors 106"), such as weight sensors, that determine the weights of items removed from the inventory locations 104. In some instances, one or more of the sensors 106 may include LFT certified scales. In other instances, one or more of the sensors may not include LFT certifies scales.

The facility 100 may also include stations 108(1)-(4) (also referred to as "stations 108") for weighing items that are priced per unit weight. For example, each of the stations 108 may include a weight sensor, such as a LFT certified scale, that is capable of determining the weights of items placed on the weight sensor. As shown, the stations 108 also include devices 110(1)-(4) (also referred to as "devices 110") that provide information to users. For example, the devices 110 may provide at least the identities of items being weighed, the weights of the items, the prices per unit weights of the items, and the total prices of the items.

As further illustrated in the example of FIG. 1, the facility 100 may include sensors 112(1)-(8) (also referred to as "sensors 112") located throughout the facility 100. In the example of FIG. 1, the sensors 112 may include imaging devices, such as cameras. However, in other examples, the sensors 112 may include any other type of sensor, such as microphones, weight sensors, and/or the like. Additionally, although the example of FIG. 1 illustrates the sensors 112 as being separate from the inventory locations 104 and the stations 108, in other examples, the sensors 112 may be located on and/or within one or more of the inventory locations 104 and/or the stations 108.

In the example of FIG. 1, and at a first time T(1), the user 102 may initially enter the facility 100 through an entry location 114 and retrieve a tote 116. The system may then associate an account of the user 102 with the tote 116 while the user 102 is located within the facility 100. For example, a device 118 associated with the tote 116 may receive information that the system uses to identify an account associated with the user 102. In some instances, the device 118 receives the information from a device 120, such as a mobile phone, in possession of the user 102. Additionally, or alternatively, in some instances, the user 102 manually inputs the information into the device 118. In either instance, the system may receive, from the device 118, data representing the information associated with the account. The system may match the information represented by the data to information that is stored in association with the account of the user 102. As such, the system may determine that the user 102 is using the tote 116 and associate with the account with the tote 116.

Next, at a second time T(2), the user 102 walks over to the inventory location 104(1) and begins to remove one or more items 122 from the inventory location 104(1). In some instances, the user 102 may place the removed item(s) 122 within a package 124, such as a bag. In some instances, the system then receives sensor data from the sensor(s) 106(1) of the inventory location 104(1). The sensor data may include, but is not limited to, the time the item(s) 122 were removed by the user 102, a first weight associated with the item(s) 122 removed, a location of the inventory location 104(1), and/or the like. Additionally, in some instances, the system may receive, from the sensor 112(1), image data representing the user 102 removing the item(s) 122 from the inventory location 104(1).

After removing the item(s) 122, and at a third time T(3), the user 102 may place the item(s) 122 on the weight sensor of the station 108(1) in order to weigh the item(s) 122. The device 110(1) associated with the station 108(1) may receive sensor data from the weight sensor that represents a second weight associated with the item(s) 122. Additionally, the device 110(1) may provide information associated with the item(s) 122 to the user 102, such as the identity of the item(s) 122, the second weight associated with the item(s) 122, the price per unit weight of the item(s) 122, and/or the total price of the item(s) 122. Once the user 102 is finished, the system may receive data (e.g., order data) from the device 110(1). The data may represent at least a time at which the item(s) 122 were weighed using the station 108(1), the identity of the item(s) 122, the second weight associated with the item(s) 122, the price per unit weight of the item(s) 122, and/or the total price of the item(s) 122.

In some instances, and at the second time T(2), the system may also receive image data generated by the sensor 112(2), where the image data represents the user 102 weighing the item(s) 122 using the station 108(1). The system may then store this image data in association with the event of the user 102 weighing the item(s) 122 using the station 108(1).

In some instances, the system may use the received sensor data and/or image data to identify the item(s) 122 that the user 102 weighed using the station 108(1). For example, the system may use the sensor data received from the inventory location 104(1) to determine the first weight associated with item(s) 122 removed from the inventory location 104(1). The system may also use the sensor data received from the device 110(1) to determine the second weight associated with the item(s) 122 as weighed using the station 108(1). The system may then determine a weight difference between the second weight and the first weight and use the weight difference to determine a probability that the item(s) 122 removed from the inventory location 104(1) are the same item(s) 122 weighed using the station 108(1). As discussed herein, the system may determine a greater probability when the weight difference includes a small difference and a smaller probability when the weight difference includes a larger difference.

In some instances, the system may use additional information when determining the probability that the item(s) 122 removed from the inventory location 104(1) are the same item(s) 122 weighed using the station 108(1). For example, the system may determine a time difference between when the item(s) 122 were removed from the inventory location 104(1) (e.g., the second time T(2)) and a time when the item(s) 122 were placed on the station 108(1) and/or weighed using the station 108(1) (e.g., the third time T(3)). The system may then use the time difference when determining the probability. For example, the system may increase the probability when the time difference is small and decrease the probability when the time difference is large. This may be because the system assumes that the user 102 is going to weigh the item(s) 122 soon after removing the item(s) 122 from the inventory location 104(1).

Additionally, or alternatively, in some instances, the system may determine a distance between the inventory location 104(1) and the station 108(1), which may be represented by the dashed line. The system may then use the distance when determining the probability. For example, the system may increase the probability when the distance is small and decrease the probability when the distance is large. This may be because the system assumes that the user 102 is going to use the station 108(1) that is closest to the inventory location 104(1) for which the item(s) 122 were removed.

Additionally, or alternatively, in some instances, the system may analyze the image data generated by the sensor 112(1) to identify one or more first characteristics associated with the package 124 used to carry the item(s) 122. The system may also analyze the image data generated by the sensor 112(2) to identify one or more second characteristics associated with the package 124 used to weigh the item(s)

122 using the station 108(1). The system may then compare the one or more first characteristics to the one or more second characteristics to determine similarities and/or differences between the one or more first characteristics and the one or more second characteristics. In some instances, based on the determination, the system may increase or decrease the probability. For example, the system may increase the probability when the one or more first characteristics are similar to the one or more second characteristics and decrease the probability when the one or more first characteristics are different than the one or more second characteristics.

The system may then use the probability to determine whether the item(s) 122 removed from the inventory location 104(1) are the same item(s) 122 that the user 102 weighed using the station 108(1). In some instances, and in the example of FIG. 1, the system determines that the item(s) 122 removed include the same item(s) 122 based on the probability satisfying a threshold probability. Additionally, or alternatively, in some instances, such as when the system is determining more than one probability for more than one item that is currently in-flight, the system determines that the item(s) 122 removed include the same item(s) 122 based on the probability being greater than any other probability.

Next, and at a fourth time T(4), the user 102 may place the item(s) 122 within the tote 116. In response, the device 118 associated with the tote 116 may receive sensor data generated by one or more sensors 126 of the tote 116, such as one or more weight sensors, that represents a third weight associated with the item(s) 122. The device 118 may then send data associated with the item(s) 122 to the system. The data may represent at least a time that the item(s) 122 were placed within the tote and the third weight associated with the item(s) 122. In some instances, the sensor(s) 126 may also include one or more imaging devices that generate image data representing the area inside of the tote 116. In such instances, the sensor(s) 126 and/or the device 118 may also send the image data to the system.

The system may use the received sensor data and/or image data to identify the item(s) 122 that the user 102 placed within the tote 116. For example, the system may use the sensor data received from the device 110(1) to determine the second weight associated with the item(s) 122 as weighed using the station 108(1). The system may also use the sensor data received from the device 118 to determine the third weight associated with the item(s) 122 placed within the tote 116. The system may then determine a weight difference between the third weight and the second weight and use the weight difference to determine a probability that the item(s) 122 weighed using the station 108(1) are the same item(s) 122 that were placed within the tote 116. As discussed herein, the system may determine a greater probability when the weight difference includes a small difference and a smaller probability when the weight difference includes a larger difference.

In some instances, the system may use additional information when determining the probability that the item(s) 122 weighed using the station 108(1) are the same item(s) 122 that were placed within the tote 116. For example, the system may determine a time difference between when the item(s) 122 were weighed using the station 108(1) and/or the item(s) 122 were removed from the station 108(1) (e.g., the third time T(3)) and a time when the item(s) 122 were placed within the tote 116 (e.g., the fourth time T(4)). The system may then use the time difference when determining the probability. For example, the system may increase the probability when the time difference is small and decrease the probability when the time difference is large. This may be because the system assumes that the user 102 is going to place the items(s) 122 within the tote 116 soon after finishing weighing the item(s) 122 using the station 108(1).

Additionally, or alternatively, in some instances, the system may determine a distance between the station 108(1) and the tote 116 at the time that the user 102 placed the item(s) 122 within the tote 116, which may be represented by the dotted line. The system may then use the distance when determining the probability. For example, the system may increase the probability when the distance is small and decrease the probability when the distance is large. This may be because the system assumes that the tote 116 will be proximate to the user 102 when the user 102 is located within the facility 100 and/or when the user 102 is weighing the item(s) 122 using the station 108(1).

Additionally, or alternatively, in some instances, the system may analyze the image data generated by the sensor 112(1) to identify one or more first characteristics associated with the package 124 used to weigh the item(s) 122 using the station 108(1). The system may also analyze the image data generated by the sensor(s) 126 to identify one or more second characteristics associated with the package 124 that was placed within the tote 116. The system may then compare the one or more first characteristics to the one or more second characteristics to determine similarities and/or differences between the one or more first characteristics and the one or more second characteristics. In some instances, based on the determination, the system may increase or decrease the probability. For example, the system may increase the probability when the one or more first characteristics are similar to the one or more second characteristics and decrease the probability when the one or more first characteristics are different than the one or more second characteristics.

The system may then use the probability to determine whether the item(s) 122 weighed using the station 108(1) are the same item(s) 122 that the user 102 placed within the tote 116. In some instances, and in the example of FIG. 1, the system determines that the item(s) 122 weighed using the station 108(1) include the same item(s) 122 based on the probability satisfying a threshold probability. Additionally, or alternatively, in some instances, such as when the system is determining more than one probability for more than one item that is currently in-flight, the system determines that the item(s) 122 weighed using the station 108(1) include the same item(s) 122 based on the probability being greater than any other probability.

In some instances, based on identifying the item(s) 122 placed within the tote 116, the system may store data associated with the item(s) 122 in association with the account of the user 102. For instance, the data may represent at least the identifier of the item(s) 122, the weight of the item(s) 122 (e.g., the second with determined using the station 108(1)), the price per unit weight of the item(s) 122, the total price of the item(s) 122, and/or any other information associated with the item(s) 122. Finally, and at a fifth time T(5), the user 102 may exit the facility 100 through an exit location 128 with just the item(s) 122 or with the tote 116 and the item(s) 122. As such, the system may use payment information, which may be stored in association with the account of the user, to process a transaction for at least the price of the item(s) 122.

Figure 2:
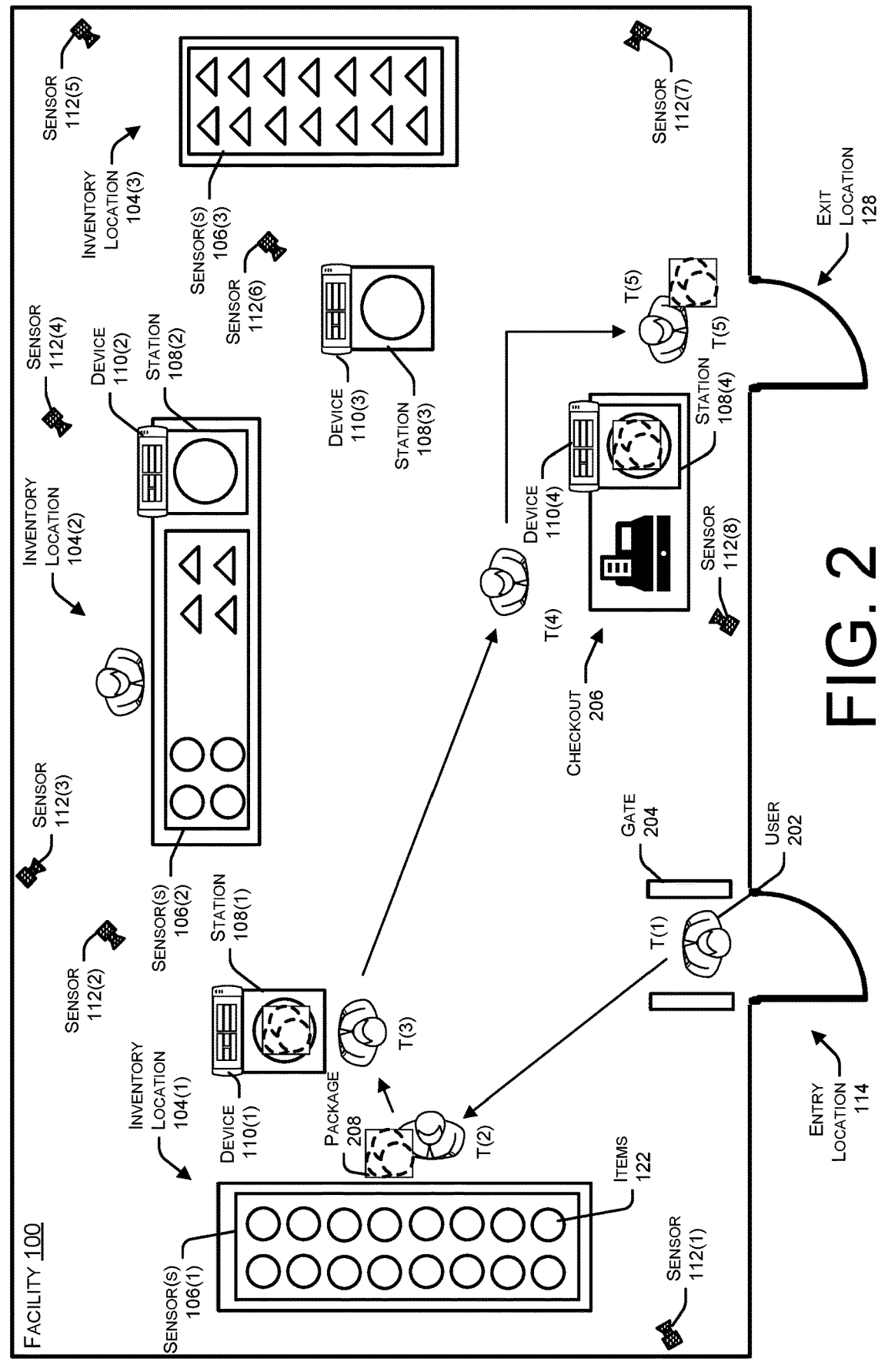
FIG. 2 illustrates the example facility of FIG. 1. In the example of FIG. 2, the system uses item weights to identify an item that a user removes from an inventory location, weighs using a station, and then acquires out using a self-checkout.

It should be noted that, in other examples, the system may perform similar processes to identify items in possession of users even when the users do not use the totes. For example, and as illustrated in the example of FIG. 2, and at a first time T(1), a user 202 may enter the facility 100. However, unlike the example of FIG. 1, entry location 114 may include an entry gate 204 that requests the user 202 provide identifying information prior to entering the facility 100. In some instances, the user 202 enters through the entry gate 204 by scanning a unique code presented on a mobile device of the user 202, such as at a scanning device at the entry gate 204. The scanning device may provide this information to a system, such as an inventory management system discussed in following figures, which may use this information for identifying the entering user 202. Of course, while this example describes identifying the user 202 based at least in part on the user 202 scanning an unique code presented on the mobile device, the system may additionally, or alternatively, identify the user 202 based on voice data (e.g., the user 202 stating his or her name), image data, password data (e.g., an alphanumeric string), credit card data, biometric data, and/or any other type of data. For instance, the system may identify the user 202 based on data provided by sensor 112(1), or based on credit card data provided by entry gate 204.

In the scenario illustrated in FIG. 2, upon the user 202 entering the facility 100 via the entry gate 204, the system generates a record indicating the presence of the identified user 202 within the facility 100. This record may be continuously or periodically updated by a locating component of the system to generate current location data of the user 202 within the facility 100, at the prior consent/request of the user 202. In some instances, the sensors 112, such as overhead cameras or the like, may be used to determine a current location of the user 202. In addition, the record generated by the system may indicate whether the user 202 is eligible to engage in the AC techniques provided by the facility 100. For example, the record may indicate whether the user 202 is able to "just walk out" with any items he or she collects within the facility 100 without first performing a manual checkout for the items. In this example, at least in part because the system has identified the user 202, the user 202 is eligible to exit the facility 100 with item(s) without performing manual checkout of the items.

Next, at a second time T(2), the user 202 walks over to the inventory location 104(1) and begins to remove one or more items 122 from the inventory location 104(1). After removing the item(s) 122, and at a third time T(3), the user 202 may place the item(s) 122 on the weight sensor of the station 108(1) in order to weigh the item(s) 122. During the second time T(2) and/or the third time T(3), the system may receive the same data as described with respect to the example of FIG. 1. Additionally, in some instances, the system may analyze the data to determine the identity of the item(s) 122 weighed by the user 202 using the station 108(1).

However, in the example of FIG. 2, and at a fourth time T(4), the user 202 may use a checkout 206, such as a self-checkout, to acquire the item(s) 122. For example, the user 202 may place the item(s) 122 on the weight sensor associated with the station 108(4). In response, the device 110(4) associated with the station 108(4) (and/or another device) may receive sensor data generated by the weight sensor, where the sensor data represents at least a weight associated with the item(s) 122. The device 110(4) (and/or another device) may then send data associated with the item(s) 122 to the system. The data may represent at least a time that the item(s) 122 were placed on the weight sensor (e.g. the fourth time T(4)) and the weight associated with the item(s) 122. In some instances, the sensor 112(8) may also generate image data representing the area that includes the checkout 206 and send the image data to the system.

The system may use the received sensor data and/or image data to identify the item(s) 122 that the user 202 is checking out, using at least some of the processes described above with respect to the example of FIG. 1. For example, the system may use the sensor data received from the device 110(1) to determine a first weight associated with the item(s) 122 as weighed using the station 108(1). The system may also use the sensor data received from the device 110(4) to determine a second weight associated with the item(s) 122 as weighed using the station 108(4). The system may then determine a weight difference between the second weight and the first weight and use the weight difference to determine a probability that the item(s) 122 weighed using the station 108(1) are the same item(s) 122 weighed using the station 108(4). As discussed herein, the system may determine a greater probability when the weight difference includes a small difference and a smaller probability when the weight difference includes a larger difference.

In some instances, the system may use additional information when determining the probability that the item(s) 122 weighed using the station 108(1) are the same item(s) 122 weighed using the station 108(4). For example, the system may determine a time difference between when the item(s) 122 were weighed using the station 108(1) and/or when the item(s) 122 were removed from the station 108(1) (e.g., the third time T(3)) and a time when the item(s) 122 were placed on the station 108(4) (e.g., the fourth time T(4)). The system may then use the time difference when determining the probability. For example, the system may increase the probability when the time difference falls within a range and decrease the probability when the time difference falls outside of the range. The range may be associated with a length of time that an average user would take to navigate from the station 108(1) to the station 108(4) and/or a time it would normally take for an average shopper to shop within the facility.

For example, the range may be between a first set time and a second set time. The first set time may correspond to the time it would take for an average user to navigate from the station 108(1) to the station 108(4) and the second set time may correspond to the time it takes for an average user to shop within the facility 100. As such, if the time difference is less than the first set time, then the system may determine that the user 202 likely did not have enough time to take the item(s) 122 from the station 108(1) to the station 108(4) and as such, the system may lower the probability. Additionally, if the time difference is greater than the second set time, then the system may determine that it is likely the user 202 had already left the facility 100 and as such, the user 202 did not place the item(s) 122 on the station 108(4). As such, the system may lower the probability. However, and in the example of FIG. 2, if the time difference falls within the range, then the system may determine that the user 202 may have placed the item(s) 122 on the station 108(4) and as such, the system may increase the probability.

Additionally, or alternatively, in some instances, the system may analyze the image data generated by the sensor 112(2) to identify one or more first characteristics associated with a package 208 used to weigh the item(s) 122 using the station 108(1). The system may also analyze the image data generated by the sensor 112(8) to identify one or more second characteristics associated with the package 208 that was placed on the station 108(4). The system may then compare the one or more first characteristics to the one or more second characteristics to determine similarities and/or differences between the one or more first characteristics and the one or more second characteristics. In some instances, based on the determination, the system may increase or decrease the probability. For example, the system may increase the probability when the one or more first characteristics are similar to the one or more second characteristics and decrease the probability when the one or more first characteristics are different than the one or more second characteristics.

The system may then use the probability to determine whether the item(s) 122 weighed using the station 108(1) are the same item(s) 122 that the user 202 placed on the station 108(4) of the checkout 206. In some instances, and in the example of FIG. 2, the system determines that the item(s) 122 weighed using the station 108(1) include the same item(s) 122 based on the probability satisfying a threshold probability. Additionally, or alternatively, in some instances, such as when the system is determining more than one probability for more than one item that is currently in-flight, the system determines that the item(s) 122 weighed using the station 108(1) include the same item(s) 122 based on the probability being greater than any other probability.

In some instances, based on identifying the item(s) 122 placed on the station 108(4), the system may store data associated with the item(s) 122 in association with the account of the user 202. For instance, the data may represent at least the identifier of the item(s) 122, the weight of the item(s) 122 (e.g., as determined using the station 108(1)), the price per unit weight of the item(s) 122, the total price of the item(s) 122, and/or any other information associated with the item(s) 122. Finally, and at a fifth time T(5), the user 202 may exit the facility 100 through the exit location 128 with the item(s) 122. As such, the system may use payment information, which may be stored in association with the account of the user 202, to process a transaction for at least the price of the item(s) 122.

It should be noted that, in some examples, the user 202 may not weigh the item(s) 122 using the station 108(4). Rather, the user 202 may remove the item(s) 122 from station 108(1) and then exit the facility 100 with the item(s) 122. In such instances, the system may be configured to perform the processes described above to identify the item(s) 122 weighed using the station 108(1). Additionally, the system may determine that the user 202 is in possession of the item(s) 122 by determining that the user 202 was located at the station 108(1) when the item(s) 122 were being weighed. The system may make the determination based on the device 110(1) receiving input that identifies the user 202, by analyzing image data to determine that the user 202 was located proximate (e.g., within a threshold distance) to the station 108(1) at the time the item(s) 122 were being weighed (e.g., the third time T(3)), and/or using one or more additional and/or alternative processes. As such, the system may determine that the user 202 was in possession of the item(s) 122 and store the data associated with the item(s) 122 in association with the account of the user 202.

Additionally, it should be noted that, in some examples, the user 202 may not weigh the item(s) 122 using the station 108(1). Rather, the user 202 may take the item(s) 122 directly to the checkout 206 and weigh the item(s) 122 using the station 108(4). In such instances, the system may perform the processes described herein to determine that the item(s) 122 removed from the inventory location 104(1) are the same item(s) 122 as the item(s) 122 placed on the station 108(4) (e.g., using the processes described above with respect to the inventory location 104(1) and the station 108(1)). Additionally, the system may determine that the user 202 is in possession of the item(s) 122 by determining that the user 202 was located at the checkout 206 when the item(s) 122 were being weighed. The system may make the determination based on the device 110(4) receiving input that identifies the user 202, by analyzing image data to determine that the user 202 was located proximate (e.g., within a threshold distance) to the checkout 206 at the time the item(s) 122 were being weighed (e.g., the fourth time T(4)), and/or using one or more additional and/or alternative processes. As such, the system may determine that the user 202 was in possession of the item(s) 122 and store the data associated with the item(s) 122 in association with the account of the user 202.

Figure 3:
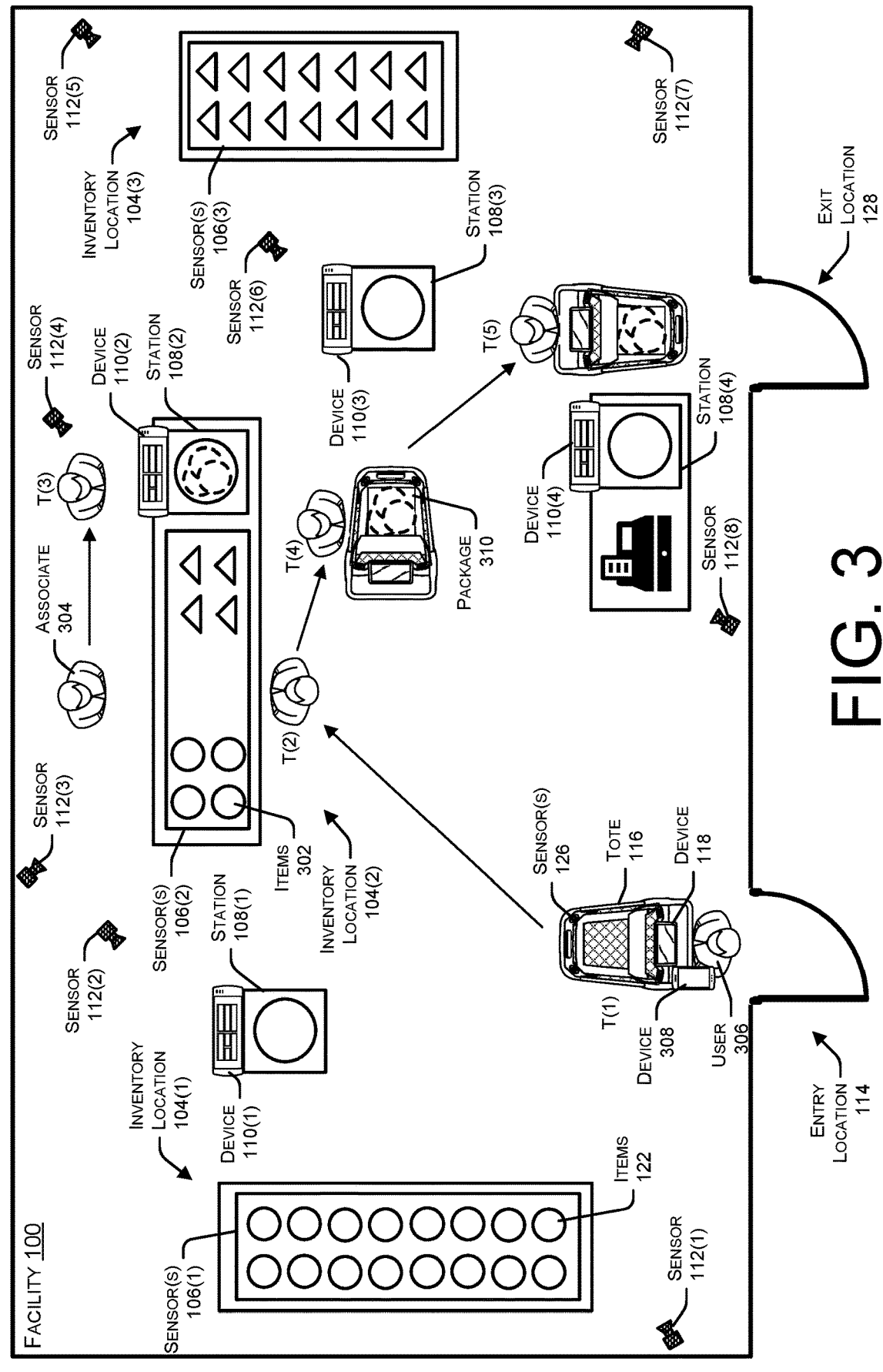
FIG. 3 illustrates the example facility of FIG. 1. In the example of FIG. 3, the system uses item weights to identify an item that an associate removes from an inventory location, weighs using a station, and then provides to a user.

FIG. 3 illustrates the example facility of FIG. 1. In the example of FIG. 3, the system identifies item(s) 302 that an associate 304 of the facility 100 removes from the inventory location 104(2), weighs using the station 108(2), and then provides to a user 306. For example, and at a first time T(1), the user 306 may initially enter the facility 100 through the entry location 114 and retrieve the tote 116. The system may then associate an account of the user 306 with the tote 116 while the user 306 is located within the facility 100. For example, the device 118 associated with the tote 116 may receive information that the system uses to identify the account associated with the user 306. In some instances, the device 118 receives the information from a device 308, such as a mobile phone, in possession of the user 306. Additionally, or alternatively, in some instances, the user 306 manually inputs the information into the device 118. In either instance, the system may receive, from the device 118, data representing the information associated with the account. The system may match the information represented by the data to information that is stored in association with the account of the user 306. As such, the system may determine that the user 306 is using the tote 116 and associate with the account with the tote 116.

Next, at a second time T(2), the user 306 walks over to the inventory location 104(2) and orders the item(s) 302 from the associate 304. In some instances, the system then receives sensor data from the sensor(s) 106(2) of the inventory location 104(2). The sensor data may include, but is not limited to, the time (e.g., the second time T(2)) the item(s) 302 were removed by the associate 304, a first weight associated with the item(s) 302 removed, a location of the inventory location 104(2), and/or the like. Additionally, in some instances, the system may receive, from the sensor 112(3), image data representing the associate 304 removing the item(s) 302 from the inventory location 104(2).

After removing the item(s) 302, and at a third time T(3), the associate 304 may place the item(s) 302 on the weight sensor of the station 108(2) in order to weigh the item(s) 302. The device 110(2) associated with the station 108(2) may receive sensor data from the weight sensor that represents a second weight associated with the item(s) 302. Additionally, the device 110(2) may provide information associated with the item(s) 302 to the associate 304 and/or the user 306, such as the identity of the item(s) 302, the second weight associated with the item(s) 302, the price per unit weight of the item(s) 302, and/or the total price of the item(s) 302. Once the associate 304 is finished, the system may receive data (e.g., order data) from the device 110(2). The data may represent at least a time (e.g., the third time T(3)) at which the item(s) 302 were weighed using the station 108(2), the identity of the item(s) 302, the second weight associated with the item(s) 302, the price per unit weight of the item(s) 302, and/or the total price of the item(s) 302.

In some instances, and at the third time T(3), the system may also receive image data generated by the sensor 112(4), where the image data represents the associate 304 weighing the item(s) 302 using the station 108(2). The system may then store this image data in association with the event of the associate 304 weighing the item(s) 302 using the station 108(2).

In some instances, the system may use the received sensor data and/or image data to identify the item(s) 302 that the associate 304 weighed using the station 108(2). For example, the system may use the sensor data received from the inventory location 104(2) to determine the first weight associated with item(s) 302 removed from the inventory location 104(2). The system may also use the sensor data received from the device 110(2) to determine the second weight associated with item(s) 302 as weighed using the station 108(2). The system may then determine a weight difference between the second weight and the first weight and use the weight difference to determine a probability that the item(s) 302 removed from the inventory location 104(2) are the same item(s) 302 weighed using the station 108(2). As discussed herein, the system may determine a greater probability when the weight difference includes a small difference and a smaller probability when the weight difference includes a larger difference.

In some instances, the system may use additional information when determining the probability that the item(s) 302 removed from the inventory location 104(2) are the same item(s) 302 weighed using the station 108(2). For example, the system may determine a time difference between when the associate 304 removed the item(s) 302 from the inventory location 104(2) (e.g., the second time T(2)) and a time when the associate 304 placed the item(s) 302 on the station 108(2) and/or the item(s) 302 were weighed using the station 108(2) (e.g., the third time T(3)). The system may then use the time difference when determining the probability. For example, the system may increase the probability when the time difference is small and decrease the probability when the time difference is large. This may be because the system assumes that the associate 304 is going to weigh the item(s) 302 soon after removing the item(s) 302 from the inventory location 104 (2).

Additionally, or alternatively, in some instances, the system may analyze the image data generated by the sensor 112(3) to identify one or more first characteristics associated with the item(s) 302 removed from the inventory location 104(2). As described herein, a characteristic may include, but is not limited to, the size of the item(s) 302, the shape of the item(s) 302, the color of the item(s) 302, the texture of the item(s) 302, and/or any other characteristic associated with the item(s) 302. The system may also analyze the image data generated by the sensor 112(4) to identify one or more second characteristics associated with the item(s) 302 weighed using the station 108(2). The system may then compare the one or more first characteristics to the one or more second characteristics to determine similarities and/or differences between the one or more first characteristics and the one or more second characteristics. In some instances, based on the determination, the system may increase or decrease the probability. For example, the system may increase the probability when the one or more first characteristics are similar to the one or more second characteristics and decrease the probability when the one or more first characteristics are different than the one or more second characteristics.

The system may then use the probability to determine whether the item(s) 302 removed from the inventory location 104(2) are the same item(s) 302 that the associate 304 weighed using the station 108(2). In some instances, and in the example of FIG. 3, the system determines that the item(s) 302 include the same item(s) 302 based on the probability satisfying a threshold probability. Additionally, or alternatively, in some instances, such as when the system is determining more than one probability for more than one item that is currently in-flight, the system determines that the item(s) 302 include the same item(s) 302 based on the probability being greater than any other probability.

Next, and at time T(4), the associate 304 may wrap the item(s) 302 in a package 310 and provide the item(s) 302 to the user 306, where the user 306 then places the item(s) 302 within the tote 116. In response, the device 118 associated with the tote 116 may receive sensor data generated by the sensor(s) 126 of the tote 116, such as the one or more weight sensors, that represents a third weight associated with the item(s) 302. The device 118 may then send data associated with the item(s) 302 to the system. The data may represent at least a time that the item(s) 302 were placed within the tote (e.g., the fourth time T(4)) and the third weight associated with the item(s) 302. In some instances, the sensor(s) 126 may also generate image data representing the area inside of the tote 116. In such instances, the sensor(s) 126 and/or the device 118 may also send the image data to the system.

The system may use the received sensor data and/or image data to identify the item(s) 302 that the user 306 placed within the tote 116. For example, the system may use the sensor data received from the device 110(2) to determine the second weight associated with the item(s) 302 as weighed using the station 108(2). The system may also use the sensor data received from the device 118 to determine the third weight associated with the item(s) 302 placed within the tote 116. The system may then determine a weight difference between the third weight and the second weight and use the weight difference to determine a probability that the item(s) 302 weighed using the station 108(2) are the same item(s) 302 that were placed within the tote 116. As discussed herein, the system may determine a greater probability when the weight difference includes a small difference and a smaller probability when the weight difference includes a larger difference.

In some instances, the system may use additional information when determining the probability that the item(s) 302 weighed using the station 108(2) are the same item(s) 302 that were placed within the tote 116. For example, the system may determine a time difference between when the item(s) 302 were weighed using the station 108(2) and/or the item(s) 302 were removed from the station 108(2) (e.g., the third time T(3)) and a time when the item(s) 302 were placed within the tote 116 (e.g., the fourth time T(4)). The system may then use the time difference when determining the probability. For example, the system may increase the probability when the time difference is small and decrease the probability when the time difference is large. This may be because the system assumes that the user 306 is going to place the items(s) 302 within the tote 116 soon after receiving the item(s) 302 from the associate 304.

Additionally, or alternatively, in some instances, the system may determine a distance between the station 108(2) and the tote 116 at the time that the user 306 places the item(s) 302 within the tote 116. The system may then use the distance when determining the probability. For example, the system may increase the probability when the distance is small and decrease the probability when the distance is large. This may be because the system assumes that the tote 116 will be proximate to the station 108(2) when the user 306 is ordering the item(s) 302 from the associate 304.

Additionally, or alternatively, in some instances, the system may analyze the image data generated by the sensor 112(4) to identify one or more first characteristics associated with the package 310 used to wrap the item(s) 302. The system may also analyze the image data generated by the sensor(s) 126 to identify one or more second characteristics associated with the package 310 that was placed within the tote 116. The system may then compare the one or more first characteristics to the one or more second characteristics to determine similarities and/or differences between the one or more first characteristics and the one or more second characteristics. In some instances, based on the determination, the system may increase or decrease the probability. For example, the system may increase the probability when the one or more first characteristics are similar to the one or more second characteristics and decrease the probability when the one or more first characteristics are different than the one or more second characteristics.

The system may then use the probability to determine whether the item(s) 302 weighed using the station 108(2) are the same item(s) 302 that the user 306 placed within the tote 116. In some instances, and in the example of FIG. 3, the system determines that the item(s) 302 weighed using the station 108(2) include the same item(s) 302 placed within the tote 166 based on the probability satisfying a threshold probability. Additionally, or alternatively, in some instances, such as when the system is determining more than one probability for more than one item that is currently in-flight, the system determines that the item(s) 302 weighed using the station 108(2) include the same item(s) 302 placed within the tote 116 based on the probability being greater than any other probability.

In some instances, based on identifying the item(s) 302 placed within the tote 116, the system may store data associated with the item(s) 302 in association with the account of the user 306. For instance, the data may represent at least the identifier of the item(s) 302, the weight of the item(s) 302 (e.g., as determined using the station 108(2)), the price per unit weight of the item(s) 302, the total price of the item(s) 302, and/or any other information associated with the item(s) 302. Finally, and at a fifth time T(5), the user 306 may exit the facility 100 through the exit location 128 with just the item(s) 302 or with the tote 116 and the item(s) 302. As such, the system may use payment information, which may be stored in association with the account of the user, to process a transaction for at least the price of the item(s) 302.

Figure 4:
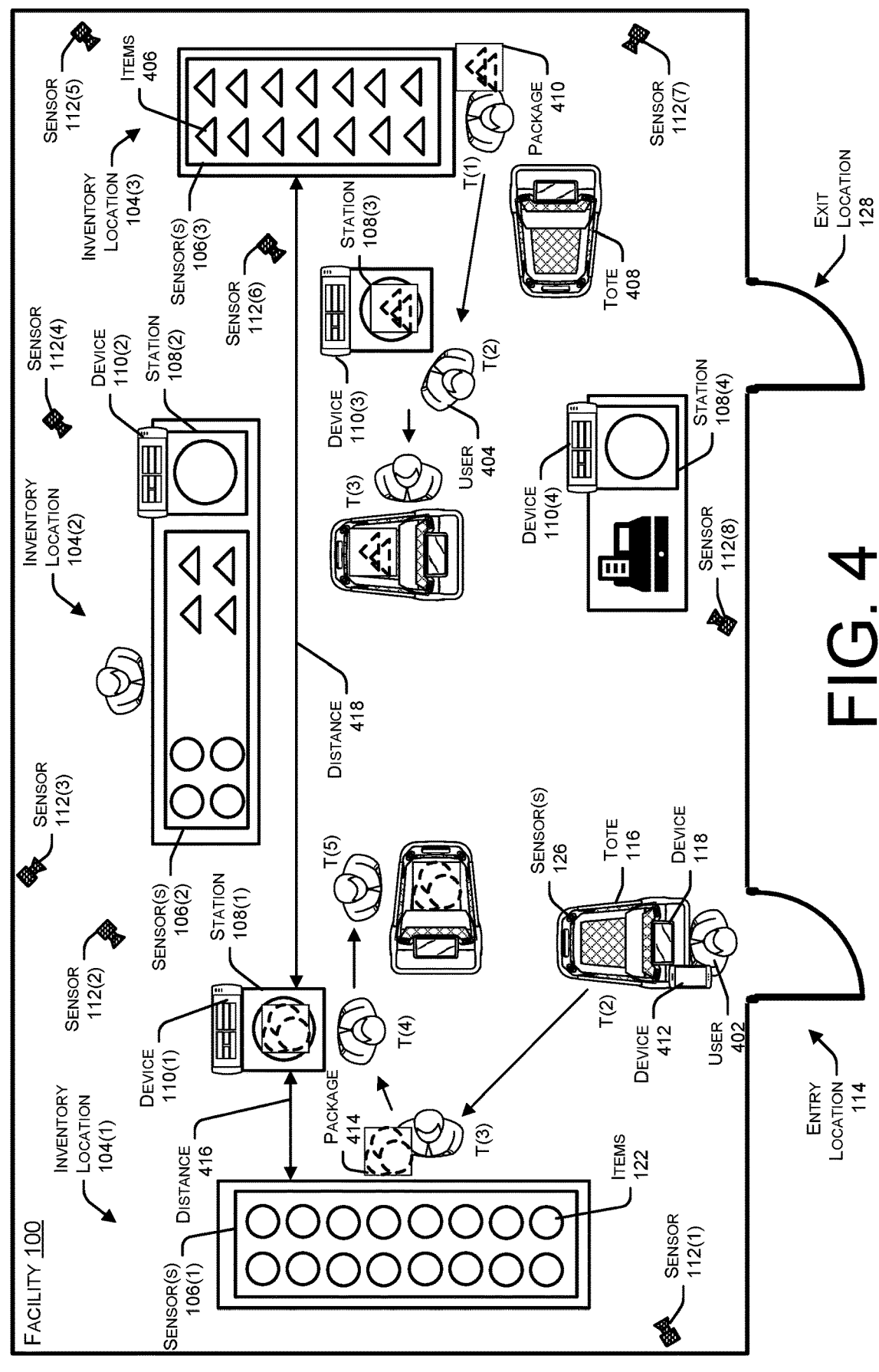
FIG. 4 illustrates the example facility of FIG. 1. In the example of FIG. 4, the system uses item weights to identify an item when there are multiple items within the facility that are in-flight.

Although the examples of FIGS. 1-3 illustrate the system identifying item(s) when there is only a single type of flight item within the facility 100, in other instances, the system may identify item(s) when there are multiple in-flight item(s) within the facility 100. For example, FIG. 4 illustrates the example facility of FIG. 1. In the example of FIG. 4, the system identifies the item(s) 122 that a first user 402 removes from the inventory location 104(1) when there are multiple in-flight item(s) within the facility 100.

For example, at a first time T(1), a second user 404 may remove item(s) 406 from the inventory location 104(3), where the system has already associated the second user 404 with a tote 408. In some instances, the second user 404 may place the removed item(s) 406 within a package 410, such as a bag. In some instances, the system then receives sensor data from the sensor(s) 106(3) of the inventory location 104(3). The sensor data may include, but is not limited to, the time the item(s) 406 were removed by the second user 404 (e.g., the first time T(1)), a first weight associated with the item(s) 406 removed, a location of the inventory location 104(3), and/or the like. Additionally, in some instances, the system may receive, from the sensor 112(7), image data representing the second user 404 removing the item(s) 406 from the inventory location 104(3).

Next, at a second time T(2), the second user 404 may place the item(s) 406 on the weight sensor of the station 108(3) in order to weigh the item(s) 406. The device 110(3) associated with the station 108(3) may receive sensor data from the weight sensor that represents a second weight associated with the item(s) 406. Additionally, the device 110(3) may provide information associated with the item(s) 406 to the second user 404, such as the identity of the item(s) 406, the second weight associated with the item(s) 406, the price per unit weight of the item(s) 406, and/or the total price of the item(s) 406. Once the second user 404 is finished, the system may receive data (e.g., order data) from the device 110(3). The data may represent at least a time at which the item(s) 406 were weighed using the station 108(3) (e.g., the second time T(2)), the identity of the item(s) 406, the second weight associated with the item(s) 406, the price per unit weight of the item(s) 406, and/or the total price of the item(s) 406.

Also, at the second time T(2), the first user 402 may enter the facility 100 through the entry location 114 and retrieve the tote 116. The system may then associate an account of the first user 402 with the tote 116 while the first user 402 is located within the facility 100. For example, the device 118 associated with the tote 116 may receive information that the system uses to identify the account of the first user 402. In some instances, the device 118 receives the information from a device 412, such as a mobile phone, in possession of the first user 402. Additionally, or alternatively, in some instances, the first user 402 manually inputs the information into the device 118. In either instance, the system may receive, from the device 118, data representing the information associated with the account. The system may match the information represented by the data to information that is stored in association with the account of the first user 402. As such, the system may determine that the first user 402 is using the tote 116 and associate with the first user 402 with the tote 116.

Next, and at a third time T(3), the second user 404 may place the item(s) 406 within the tote 408. In response, a device associated with the tote 408 may receive sensor data generated by one or more sensors of the tote 408, such as one or more weight sensors, that represents a third weight associated with the item(s) 406. The device may then send data associated with the item(s) 406 to the system. The data may represent at least a time that the item(s) 406 were placed within the tote 408 (e.g., the third time T(3)) and the third weight associated with the item(s) 406. In some instances, additional sensor(s) associated with the tote 408 may also generate image data representing the area inside of the tote 408. In such instances, the system may receive the image data from the device and/or the sensors associated with the tote 408.

Also, at the third time T(3), the first user 402 walks over to the inventory location 104(1) and begins to remove the item(s) 122 from the inventory location 104(1). In some instances, the first user 402 may place the removed item(s) 122 within a package 414, such as a bag. In some instances, the system then receives sensor data from the sensor(s) 106(1) of the inventory location 104(1). The sensor data may include, but is not limited to, the time the item(s) 122 were removed by the first user 402 (e.g., the third time T(3)), a first weight associated with the item(s) 122 removed, a location of the inventory location 104(1), and/or the like. Additionally, in some instances, the system may receive, from the sensor 112(1), image data representing the first user 402 removing the item(s) 122 from the inventory location 104(1).

After removing the item(s) 122, and at a fourth time T(4), the first user 402 may place the item(s) 122 on the weight sensor of the station 108(1) in order to weigh the item(s) 122. The device 110(1) associated with the station 108(1) may receive sensor data from the weight sensor that represents a second weight associated with the item(s) 122. Additionally, the device 110(1) may provide information associated with the item(s) 122 to the first user 402, such as the identity of the item(s) 122, the second weight associated with the item(s) 122, the price per unit weight of the item(s) 122, and/or the total price of the item(s) 122. Once the first user 402 is finished, the system may receive data (e.g., order data) from the device 110(1). The data may represent at least a time at which the item(s) 122 were weighed using the station 108(1) (e.g., the fourth time T(4)), the identity of the item(s) 122, the second weight associated with the item(s) 122, the price per unit weight of the item(s) 122, and/or the total price of the item(s) 122.

In some instances, and at the fourth time T(4), the system may also receive image data generated by the sensor 112(2), where the image data represents the first user 402 weighing the item(s) 122 using the station 108(1). The system may then store this image data in association with the event of the first user 402 weighing the item(s) 122 using the station 108(1).

In some instances, the system may use the received sensor data and/or image data to identify the item(s) 122 that the first user 402 weighed using the station 108(1). In the example of FIG. 4, there may be two item(s) that are in-flight since the system has yet to determine that the second user 404 includes the user that removed the item(s) 406. As such, the system may perform additional processes for identifying the item(s) 122 that the first user 402 weighed using the station 108(1).

For example, the system may use the sensor data received from the inventory location 104(1) to determine the first weight associated with item(s) 122 removed from the inventory location 104(1). The system may also use the sensor data received from the inventory location 104(3) to determine the first weight associated with the item(s) 406 removed from the inventory location 104(3). The system may then determine a first weight difference between the first weight associated with the item(s) 122 removed from the inventory location 104(1) and the second weight associated with the item(s) 122 as weighed using the station 108(1). Additionally, the system may determine a second weight difference between the first weight associated with the item(s) 406 removed from the inventory location 104(3) and the second weight associated with the item(s) 122 as weighed using the station 108(1). The system may then use the first weight difference and the second weight difference to identify the item(s) 122 weighed using the station 108(1).

For example, the system may determine a first probability that the item(s) 122 weighed using the station 108(1) include the item(s) 122 removed from the inventory location 104(1) using the first weight difference. The system may also determine a second probability that the item(s) 122 weighed using the station 108(1) include the item(s) 406 removed from the inventory location 104(3) using the second weight difference. In the example of FIG. 4, the first weight difference may be less than the second weight difference.

For example, the first weight difference may be 0.2 pounds and the second weight difference may be 1.5 pounds. As such, the system may determine that the first probability is greater than the second probability.

In some instances, the system may use additional information when determining the first probability and/or the second probability. For example, the system may determine a first time difference between when the item(s) 122 were removed from the inventory location 104(1) (e.g., the third time T(3)) and a time when the item(s) 122 were placed on the station 108(1) and/or weighed using the station 108(1) (e.g., the fourth time T(4)). The system may also determine a second time difference between when the item(s) 406 were removed from the inventory location 104(3) (e.g., the first time T(1)) and the time when the item(s) 122 were placed on the station 108(1) and/or weighed using the station 108(1) (e.g., the fourth time T(4)). In the example of FIG. 4, the second time difference is greater than the first time difference. As such, the system may increase the first probability that the item(s) 122 weighed using the station 108(1) include the item(s) 122 removed from the inventory location 104(1). The system may also decrease the second probability that the item(s) 122 weighed using the station 108(1) include the item(s) 406 removed from the inventory location 104(3).

Additionally, or alternatively, in some instances, the system may determine a first distance 416 between the inventory location 104(1) and the station 108(1) using the location associated with the inventory location 104(1) and the location associated with the station 108(1). The system may also determine a second distance 418 between the inventory location 104(3) and the station 108(1) using the location associated with the inventory location 104(3) and the location associated with the station 108(1). In the example of FIG. 4, the second distance 418 may be greater than the first distance 416. As such, the system may increase the first probability that the item(s) 122 weighed using the station 108(1) include the item(s) 122 removed from the inventory location 104(1). The system may also decrease the second probability that the item(s) 122 weighed using the station 108(1) include the item(s) 406 removed from the inventory location 104(3).

Additionally, or alternatively, in some instances, the system may analyze the image data generated by the sensor 112(1) to identify one or more first characteristics associated with the package 414 used to carry the item(s) 122. The system may also analyze the image data generated by the sensor 112(7) to determine one or more second characteristics associated with the package 410 used to carry the item(s) 406. Furthermore, the system may analyze the image data generated by the sensor 112(2) to identify one or more third characteristics associated with the package 414 used to weigh the item(s) 122 using the station 108(1). The system may then compare the one or more first characteristics to the one or more third characteristics to determine that the package 414 used to weigh the item(s) 122 is similar to the package 414 used to carry the item(s) 122. Additionally, system may compare the one or more second characteristics to the one or more third characteristics to determine that the package 414 used to weigh the item(s) 122 is not similar to the package 410 used to carry the item(s) 406. As such, the system may increase the first probability that the item(s) 122 weighed using the station 108(1) include the item(s) 122 removed from the inventory location 104(1). The system may also decrease the second probability that the item(s) 122 weighed using the station 108(1) include the item(s) 406 removed from the inventory location 104(3).

The system may then use the first probability and/or the second probability to identify the item(s) 122 that the first user 402 weighed using the station 108(1). For a first example, the system may determine that the first probability satisfies (e.g., is equal to or greater than) a threshold probability and determine that the second probability does not satisfy (e.g., is less than) the threshold probability. As such, the system may determine that the item(s) 122 weighed by the first user 402 include the item(s) 122 removed from the inventory location 104(1). For a second example, the system may determine that the first probability is greater than the second probability. As such, the system may again determine that the item(s) 122 weighed by the first user 402 include the item(s) 122 removed from the inventory location 104(1).

Next, and at a fifth T(5), the first user 402 may place the item(s) 122 within the tote 116. In response, the device 118 associated with the tote 116 may receive sensor data generated by the one or more sensors 126 of the tote 116, such as the one or more weight sensors, that represents a third weight associated with the item(s) 122. The device 118 may then send data associated with the item(s) 122 to the system. The data may represent at least a time at which the item(s) 122 were placed within the tote 116 (e.g., the fifth time T(5)) and the third weight associated with the item(s) 122. In some instances, the sensor(s) 126 may also generate image data representing the area inside of the tote 116. In such instances, the sensor(s) 126 and/or the device 118 may also send the image data to the system.

The system may then use the received sensor data and/or image data to identify the item(s) 122 that the first user 402 placed within the tote 116. In the example of FIG. 4, there may again be two item(s) that are in-flight since the system has yet to determine that the second item(s) 406 were placed within the tote 408. As such, the system may perform additional processes for identifying the item(s) 122 that the first user 402 placed within the tote 116.

For example, the system may use the sensor data received from the station 108(1) to determine the second weight associated with item(s) 122 weighed using the station 108(1). The system may also use the sensor data received from the station 108(3) to determine the second weight associated with the item(s) 406 weighed using the station 108(3). The system may then determine a first weight difference between the second weight associated with the item(s) 122 weighed using the station 108(1) and the third weight associated with the item(s) 122 placed within the tote 116. Additionally, the system may determine a second weight difference between the second weight associated with the item(s) 406 weighed using the station 108(3) and the third weight associated with the item(s) 122 placed within the tote 116. The system may then use the first weight difference and the second weight difference to identify the item(s) 122 placed within the tote 116.

For example, the system may determine a first probability that the item(s) 122 placed within the tote 116 include the item(s) 122 weighed using the station 108(1) using the first weight difference. The system may also determine a second probability that the item(s) 122 placed within the tote 116 include the item(s) 406 weighed using the station 108(3) using the second weight difference. In the example of FIG. 4, the first weight difference may be less than the second weight difference. For example, the first weight difference may be 0.2 pounds and the second weight difference may be 1.5 pounds. As such, the system may determine that the first probability is greater than the second probability.

In some instances, the system may use additional information when determining the first probability and/or the second probability. For example, the system may determine a first time difference between when the item(s) 122 were weighed using the station 108(1) and/or removed from the station 108(1) (e.g., the fourth time T(4)) and a time when the item(s) 122 were placed within the tote 116 (e.g., the fifth time T(5)). The system may also determine a second time difference between when the item(s) 406 were weighed using the station 108(3) and/or removed from the station 108(3) (e.g., the second time T(2)) and the time when the item(s) 122 were placed within the tote 116 (e.g., the fifth time T(5)). In the example of FIG. 4, the second time difference is greater than the first time difference. As such, the system may increase the first probability that the item(s) 122 placed within the tote 116 include the item(s) 122 weighed using the station 108(1). The system may also decrease the second probability that the item(s) 122 placed within the tote 116 include the item(s) 406 weighed using the station 108(3).

Additionally, or alternatively, in some instances, the system may determine a first distance between the station 108(1) and the tote 116 using the location associated with the station 108(1) and the location associated with the tote 116 when the item(s) 122 were placed within the tote 116. The system may also determine a second distance between the station 108(3) and the tote 116 using the location associated with the station 108(3) and the location associated with the tote 116 when the item(s) 122 were placed within the tote 116. In the example of FIG. 4, the second distance may be greater than the first distance. As such, the system may increase the first probability that the item(s) 122 placed within the tote 116 include the item(s) 122 weighed using the station 108(1). The system may also decrease the second probability that the item(s) 122 placed within the tote 116 include the item(s) 406 weighed using the station 108(3).

Additionally, or alternatively, in some instances, the system may analyze the image data generated by the sensor 112(2) to identify one or more first characteristics associated with the package 414 used to weigh the item(s) 122. The system may also analyze the image data generated by the sensor 112(6) to determine one or more second characteristics associated with the package 410 used to weigh the item(s) 406. Furthermore, the system may analyze the image data generated by the sensor(s) 126 to identify one or more third characteristics associated with the package 414 placed within the tote 116. The system may then compare the one or more third characteristics to the one or more first characteristics to determine that the package 414 placed within the tote 116 is similar to the package 414 used to weigh the item(s) 122. Additionally, system may compare the one or more third characteristics to the one or more second characteristics to determine that the package 414 placed within the tote 116 is not similar to the package 410 used to weigh the item(s) 406. As such, the system may increase the first probability that the item(s) 122 placed within the tote 116 include the item(s) 122 weighed using the station 108(1). The system may also decrease the second probability that the item(s) 122 placed within the tote 116 include the item(s) 406 weighed using the station 108(3).

The system may then use the first probability and/or the second probability to identify the item(s) 122 that the first user 402 placed within the tote 116. For a first example, the system may determine that the first probability satisfies a threshold probability and determine that the second probability does not satisfy the threshold probability. As such, the system may determine that the item(s) 122 placed within the tote 116 include the item(s) 122 weighed using the station 108(1). For a second example, the system may determine that the first probability is greater than the second probability. As such, the system may determine that the item(s) 122 placed within the tote 116 include the item(s) 122 weighed using the station 108(1).

In some instances, based on identifying the item(s) 122 placed within the tote 116, the system may store data associated with the item(s) 122 in association with the account of the first user 402. For instance, the data may represent at least the identifier of the item(s) 122, the weight of the item(s) 122 (e.g., as determined using the station 108(1)), the price per unit weight of the item(s) 122, the total price of the item(s) 122, and/or any other information associated with the item(s) 122. Finally, the first user 402 may exit the facility 100 through the exit location 128 with just the item(s) 122 or with the tote 116 and the item(s) 122. As such, the system may use payment information, which may be stored in association with the account of the first user 402, to process a transaction for at least the price of the item(s) 122.

In some instances, the system may perform similar processes to determine that the item(s) 406 weighed using the station 108(3) include the same item(s) 406 removed from the inventory location 104(3). The system may also perform similar processes to determine that the item(s) 406 placed within the tote 408 include the same item(s) 406 weighed using the station 108(3). In other words, even when there are multiple items in-flight within the facility 100, the system is able to determine which users within the facility 100 removed each of the items and associate those items with the accounts of the users.

Figure 5:
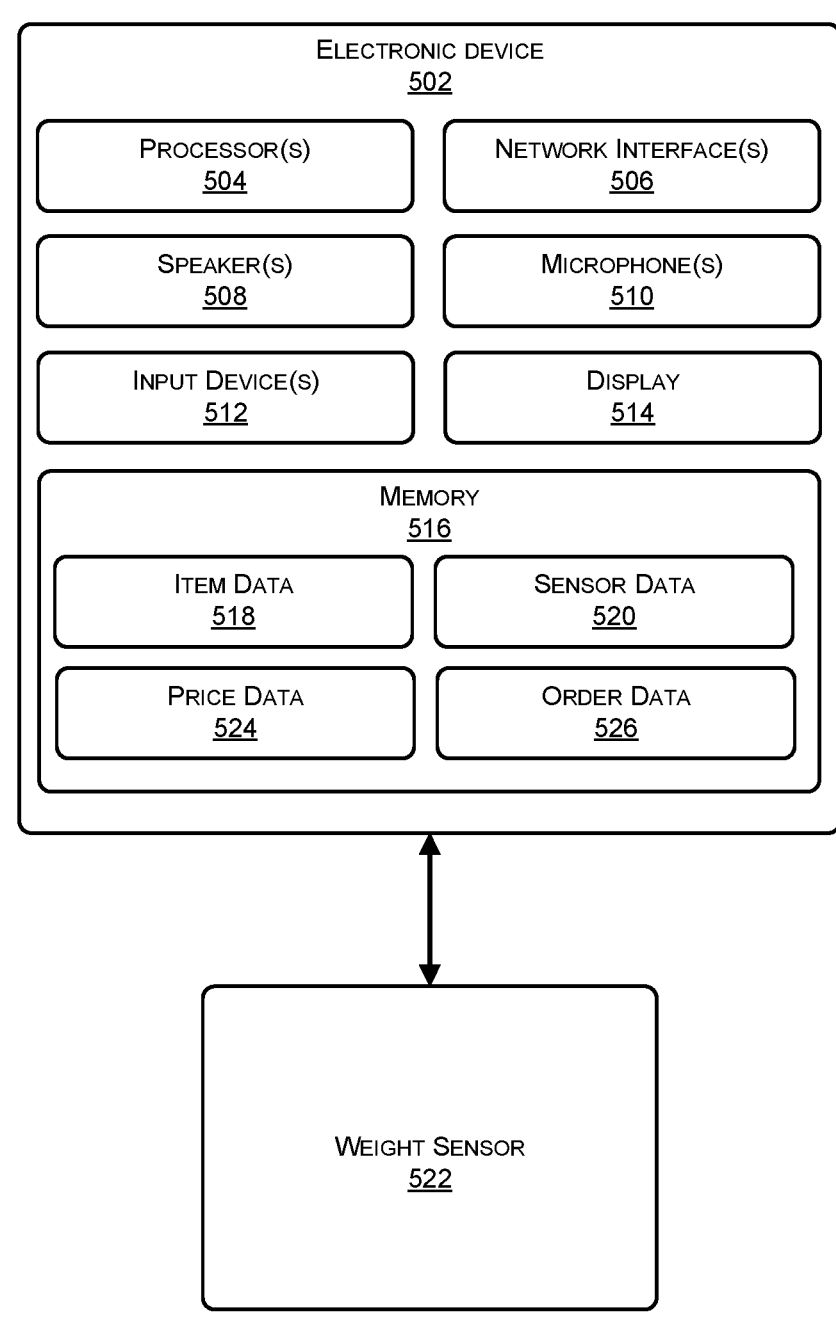
FIG. 5 illustrates a block diagram of example components that may be included in a station for weighing items.

FIG. 5 illustrates a block diagram of example components that may be included in a station (e.g., the stations 108) for weighing items. As shown, the electronic device 502 includes processor(s) 504, network interface(s) 506, speaker(s) 508, microphone(s) 510, input device(s) 512, a display 514, and memory 516. In some instances, the electronic device 502 may include one or more additional components not illustrated in the example of FIG. 5. In some instances, the electronic device 502 may not include one or more of the speaker(s) 508, the microphone(s) 510, the input device(s) 512, or the display 514.

The input device(s) 512 may include button(s), key(s), joystick(s), touch-sensitive pad(s), trigger(s), sensor(s) that detect movement of the electronic device 502 (e.g., accelerometer(s), magnetometer(s), etc.), touch inputs to the display 514, and/or any other type of device that is able to receive input from the user.

The electronic device 502 may include the memory 516. The memory 516 may be used to store any number of software components that are executable by the processor(s) 504. As shown, the memory 516 may store item data 518. The item data 518 may represent the identities of items that are available at a facility. As described herein, an identity may include, but is not limited to, a name, a classifier, an identifier (e.g., a numerical identifier, an alphabetic identifier, a mixed numerical and alphabetic identifier, etc.), and/or any other type of identifier that identifies an item. In some instances, the electronic device 502 receives the item data 518 from the system. In some instances, the electronic device 502 receives the item data 518 at a time at which a user is positioned near the electronic device 502. Still, in some instances, the electronic device 502 receives the item data 518 based on sending a request to the system, such as when a user is weighing items.

The memory 516 may further be used to store sensor data 520 generated by a weight sensor 522. The sensor data 522 may represent the weight of one or more items that are placed on the weight sensor 522, such as by a user. In some instances, the electronic device 502 receives the sensor data 520 at given time intervals (e.g., every second, every five seconds, every minute, and/or the like). In some instances, the electronic device 502 receives the sensor data 520 each time the weight sensor detects a change in weight. Still, in some instances, the electronic device 502 receives the sensor data 520 based on requesting the sensor data 520 from the weight sensor 522.

In some instances, the memory 516 may be used to store price data 524 associated with items. The price data 524 associated with an item may represent the price per unit weight associated with the item. For example, the price data 524 associated with a type of fruit may indicate that the fruit is $1.50 per pound. In some instances, the electronic device 502 receives the price data from the system. In some instances, the electronic device 502 receives the price data 524 at a time at which a user is poisoned near the electronic device 502. Still, in some instances, the electronic device 502 receives the price data 524 based on sending a request to the system, such as when a user is weighing items.

As further illustrated in the example of FIG. 5, the memory 516 may be used to store order data 526. The order data 526 may represent orders that are placed using the electronic device 502 (e.g., using the station). For example, the order data 526 associated with an order may represent at least a time of the order, identifier(s) associated with item(s), a weight of the item(s), a price per unit weight associated with the item(s), a total price of the item(s), and/or the like. In some instances, the electronic device 502 may store the order data 526 for a given period of time (e.g., one hour, ten hours, one day, etc.). In some instances, the electronic device 502 may store the order data 526 until the electronic device 502 sends the order data 526 to the system.

In some instances, the weight sensor 522 may include a LFT commercial scale, which is tested and verified to meet national standards and/or local regulations. For instance, the National Type Evaluation Program (NTEP) may have evaluated the weight sensor 522 and issued a Certification of Conformance (CC) for the weight sensor 522. In some instances, the weight sensor 522 may include at least a top platter and base.

As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, discussed herein, may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable messages between devices. The network interface(s) may include one or more network interface controllers (NICs) or other types of transceiver devices to send and receive messages over network(s). For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

Figure 6:
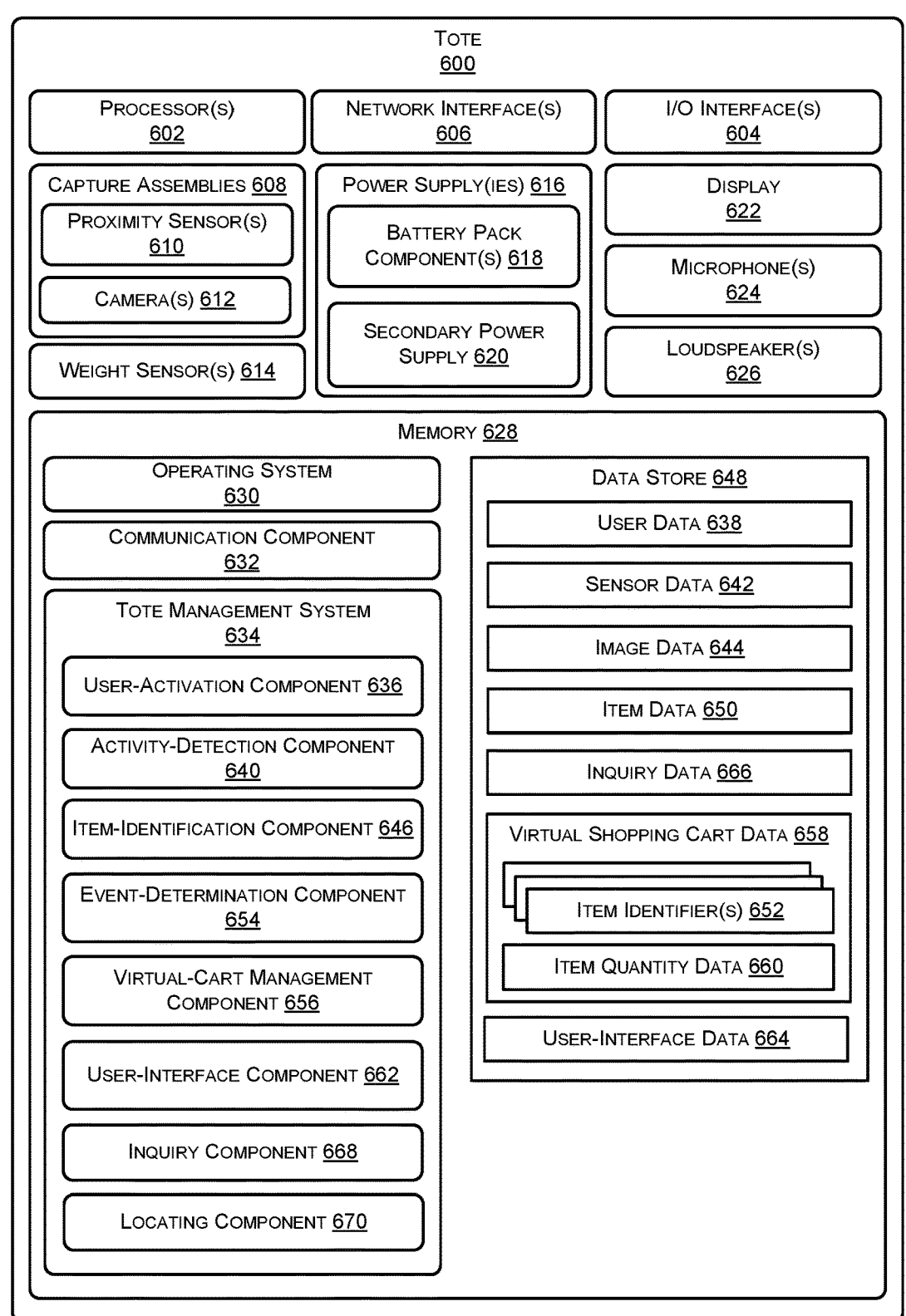
FIG. 6 illustrates example components of a tote configured to support the item identifying processes described herein.

FIG. 6 illustrates example components of a tote 600 configured to support the identifying item processes described herein. In some instances, the tote 600 may represent, and/or be similar to, the tote 116 and/or the tote 408.

The tote 600 may include one or more hardware processors 602 (processors) configured to execute one or more stored instructions. The tote 600 may also include one or more input/output (I/O) interfaces 604 to allow the processor(s) 602 or other portions of the tote 600 to communicate with other devices. The I/O interface(s) 604 may comprise Inter-Integrated Circuit (I2C), Serial Peripheral Interface bus (SPI), Universal Serial Bus (USB) as promulgated by the USB Implementers Forum, and so forth. The I/O interface(s) 604 may allow the various modules/components to communicate with each other and/or control each other.

The tote 600 may also include one or more network interfaces 606. The network interface(s) 606 are configured to provide communications between the tote 600 and other devices, such as the system, the stations 108, the sensors 106, the sensors 112, and so forth.

The tote 600 may also include the one or more capture assemblies 608 that each include one or more proximity sensors 610, a camera (or other imaging device) 612, and one or more LEDs. The proximity sensor(s) 610 may comprise any type of sensor that is able to detect the presence of nearby objects without the need for physical contact (e.g., ToF sensors, PIR sensors, etc.). The camera(s) 612 in each of the capture assemblies 608 may comprise any type of camera or imaging device configured to generate image data (and/or video data), or information descriptive of a plurality of picture elements or pixels. The LED(s) may be selectively activated to emit light at any wavelength, visible or non-visible to users.

The tote 600 may also include one or more weight sensors 614. In some instances, the weight senor(s) 614 may include a LFT commercial scale(s), which is tested and verified to meet national standards and/or local regulations. For instance, the NTEP may have evaluated the weight sensor(s) 614 and issued a CC for the weight sensor 522. However, in other instances, the weight sensor(s) 614 may not include LFT commercial scale(s) and/or may not verified using national and/or local standard.

The tote 600 may include one or more power supplies 616 to provide power to the components of the tote 600, such as the battery pack component 618. The power supply(ies) 616 may also include a secondary (e.g., internal) power supply 620 to allow for hot swapping of battery pack component(s) 618, such as one or more capacitors, internal batteries, etc.

The tote 600 may also include a display 622 configured to display image data, such as pictures, videos, user interface elements, and/or any other image data. The display 622 may comprise any type of display 622, and may further be a touch screen to receive touch input from a user. The tote 600 may also include one or more microphones 624 and one or more loudspeakers 626 to facilitate a dialogue with a user, and/or to receive feedback from the user. The microphone(s) 624 may capture sound representing the user's speech, and the loudspeaker(s) 626 may output machine-generated words to facilitate a dialogue, prompt a user for feedback on an item and/or for other information, and/or output other alerts or notifications.

The tote 600 may include one or more memories 628. The memory 628 may include at least one operating system (OS) component 630. The OS component 630 is configured to manage hardware resource devices such as the I/O interface(s) 604, the network interface(s) 606, and provide various services to applications or components executing on the processor(s) 602. The OS component 630 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 628. These components may be executed as foreground applications, background tasks, daemons, and so forth. A communication component 632 may be configured to establish communications with one or more of the sensors, one or more of the systems, or other devices. The communications may be authenticated, encrypted, and so forth.

The memory 628 may further store a tote management system 634. The tote management system 634 is configured to provide the item-identifying functions (and other functions) provided by the tote 600 as described herein. For example, the tote management system 634 may be detect items, identify items, and maintain a virtual shopping tote for a user of the tote 600.

The tote management system 634 may include a user-activation component 636 that performs operations for activating a shopping session using a tote 600 on behalf of a user. For instance, a user may have previously registered for a user account with an operator of the facility to utilize various automated management services provided by an operator of the facility 100. The user may have registered for a user account, such as by providing user data 638, to automate payments made for items taken by the user and included a payment means (e.g., credit card, bank account number, etc.), and may have also provided an identification means in the user data 638 to the user-activation component 636 such that the tote 600 can recognize the user. For instance, the user may have registered to identify themselves to the tote 600 using any identification technique by the user-activation component 636, such as by providing user data 638 by presenting an identification means to a camera/scanner 612 (e.g., presenting a driver's license, presenting a facility-issued card, presenting a user identifier via a mobile phone, etc.), speaking a predefined utterance that is captured by the microphone(s) 624 (e.g., a name of the user, a predefined keyword, etc.), and/or the like. Once a user has identified themselves to using the user-activation component 636, the user-activation component 636 may open a shopping session where the tote 600 identifies and track items retrieved by the user and placed within the tote 600.

The tote management system 634 may additionally include an activity-detection component 640 configured to detect items (or objects) within a particular proximity to the tote 600. For example, one or more proximity sensors 610 may generate sensor data 642 that indicates a distance between the proximity sensor(s) 610 and any objects located in the FOV of the proximity sensor(s) 610. The activity-detection component 640 may analyze the sensor data 642 and determine if an object is within a threshold distance indicating that the object is near the tote 600 and/or within or near the perimeter of the top of the basket of the tote 600 (e.g., one foot from the proximity sensor(s) 610, two feet from the proximity sensor(s) 610, etc.). In this way, the proximity sensor(s) 610 may generate sensor data 642 that indicates whether or not an item is being moved in or out of the basket of the tote 600. However, in some examples, rather than using sensor data 642 generated by a proximity sensor(s) 610, the activity-detection component 640 may utilize image data 644 generated by the camera(s) 612 to determine if an object is within a threshold distance from the tote 600.

The tote management system 634 may also include an item-identification component 646 configured to analyze image data 644 to identify an item represented in the image data 644. The image data 644 may comprise information descriptive of a plurality of picture elements, or pixels, for one or more image frames (e.g., a still picture, multiple picture frames, video frames, etc.). The item-identification component 646 may analyze the image data 644 using various image processing techniques, or computer vision techniques. For instance, the item-identification component 646 may extract a representation of an item depicted in the image data 644 generated by at least one camera(s) 612. The representation may include identifying text printed on the item, colors or color schemes printed in the item, determining 2-D and/or 3D shapes of the items, and/or other techniques for extract a representation of the item. In some instances, the representation of the item depicted in the image data 644 may comprise a numeric representation, such as a feature vector or a set of feature vectors.

In some examples, a data store 648 stored in the memory 628 may include item data 650, which may include representations of the items offered for acquisition at the facility 100. The item-identification component 646 may compare the extracted represented of the item with the "gallery" or stored representations of the known items in the item data 650. In some instance, the item representation may include an indication of a barcode or SKU data for the item as recognized in, or extracted from, the image data 644. The item-identification component 646 may determine confidence level data based on the comparisons with item representation in the item data 650. The item-identification component 646 may determine, and assign, confidence levels indicating how likely it is that the item represented in the image data 650 corresponds to an item from the item gallery in the item data 650. Based on the confidence level data, the item-identification component 646 may determine an item identifier 652 for the item in the image data 644 (or multiple item identifiers 652) that corresponds to an item in the item data 650 to which the item corresponds.

In some instances, the item represented by the image data 644 may include a type of package, where the package is for storing other items. As such, the item-dentification component 646 may be configured to perform the processes described herein to determine the type of package that has been placed within the tote.

The tote management system 634 may further include an event-determination component 654 to determine event-description data for the item represented by the image data 650. The event-determination component 654 may determine if the user is adding an item to the tote 600, removing the item from the tote 600, etc., based on movement of the item and/or whether the item is shown in the image data 644. For instance, if the item is shown as being moved downward towards the interior of the tote 600, and the user's hand then leaves the basket without the item, it can be determined that the user added the item to the tote 600. Similarly, if the user's hand moves into the tote without an item, and is depicted in the image data 644 taking an item from the tote, the event-determination component 654 may determine that the user removed an item from the tote 600.

The tote management system 634 may also include a virtual-tote management component 656 configured to manage virtual shopping tote data 658 for the tote 600. For instance, the virtual-tote management component 656 may utilize the item data 650, event-description data, and confidence level data to add item identifier(s) 652 to the virtual shopping tote data 658 for items that were added to the tote 600, remove item identifier(s) 652 from the virtual shopping tote data 658 for items that were removed from the tote 600, and track item quantity data 660 indicating quantities of particular items within the tote 600.

The tote management system 634 may further include a user-interface component 662 configured to present user interfaces on the display 622 based on user-interface data 664. The user interfaces may include one or more fields to present data, and/or receive touch input (or other input via a keyboard, mouse, etc.) from a user. For instance, if the item-identification component 646 is unable to determine an item identifier 652 for an item shown in the image data 644 (and/or determined using any of the processes described herein), the user-interface component 662 may receive inquiry data 666 generated by an inquiry component 668 to prompt a user for feedback to help identify the item, and/or other information (e.g., if multiple items were placed within the tote 600). The inquiry component 668 may be configured to generate inquiry data 666 based on the information needed to identify the item. For instance, the inquiry data 666 may include a prompt to request particular feedback from the user, such as to provide input (e.g., touch input, vocal/utterance input, etc.) to identify the item, input to indicate how many items were added to the tote, input to indicate whether an item was removed or added, etc. In some examples, the user-interface component 662 may present one or more images depicting items from the item data 650 that have the highest confidence levels as corresponding to the item represented by the image data 644, but confidence levels that are not high enough to make a final decision as to the item. For instance, the user-interface component 662 may present pictures of two different items that have high confidence levels and request that the user select or indicate the appropriate item. Additionally, or alternatively, the user-interface component 662 may present prompts for the user for feedback regarding whether or not the item was added to, or removed from the tote 600.

In some examples, the tote management system 634 may further include a locating component 670 configured to determine locations of the tote 600 in the facility 100. For instance, the locating component 670 may analyze sensor data 642 collected by sensors of the tote 600 to determine a location. In some examples, the network interface(s) 606 may include network interfaces that configured the tote 600 to receive or detect wireless signals (e.g., WiFi signals, Bluetooth signals, etc.) and generate sensor data 642 indicative of the signals. The locating component 670 may analyze the sensor data 642 using various techniques to identify the location of the tote 600, such as WiFi triangulation, received signal strength indicators (RSSI), and/or other methods for analyzing wireless signals to determine a location of the tote 600. In some instances, the facility 100 may include various infrared (IR) or near-IR emitters at different locations that emit light according to frequencies, patterns, etc. that indicate the different locations in the facility 100. In such examples, the tote 600 may include a light sensor to generate the sensor data 642 representing the IR or NIR and determine the location of the tote 600 in the facility. In some instances, there may be visible landmarks or markers throughout the facility that indicate a location in the facility 100, and the locating component 670 may analyze image data 644 generated by an outward facing camera 612 to determine a location of the tote 600. As another example, there may be various radio frequency (RF) emitters positioned throughout the store, and the tote 600 may include an RF receiver to allow the locating component 670 to perform IR beaconing to determine the location of the tote 600. The locating component 670 may perform one, or any combination, of the above techniques to determine a location of the tote 600 in the facility and/or any other technique known in the art.

In some instances, the weight sensor(s) 614 may be configured to detect weights of items placed within the tote 600. The weight sensor(s) 614 may then be configured to generate sensor data 642 that represents at least the weights of the items. This sensor data may be sent to the display 622 and/or the system. As described herein, the device 118 may include one or more of the components illustrated in the example of FIG. 6.

FIGS. 7A-9 illustrate various processes for implementing AC techniques for customers of facilities. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIGS. 7A-7B are an example process 700 for using sensor data representing weights of items in order to identify and associate an item with an account of a user. At 702, the process 700 may include receiving, from a first device associated with a tote, first data representing account identification information and at 704, the process 700 may include determining an account based at least in part on the first data. For instance, the system may receive the first data from the first device attached to the tote. In some instances, the tote may include a shopping cart within the facility. In some instances, the account identification information may include, but is not limited to, an identifier (e.g., a user name, a name, etc.), a password, payment information, a code (e.g., a QR code, etc.), biometric information, and/or any other type of information that the system may associate with the account. The system may then match at least a portion of the first data to additional data stored in association with the account, where the additional data represents at least a portion of the account identification information.

At 706, the process 700 may include associating the tote with the account. For instance, they system may store data that associates the tote with the account. This way, the system may later use the association when associating items removed by a user with the account. For example, the system may associate items placed within the tote with the account.

At 708, the process 700 may include receiving, from a second device associated with a station, second data representing at least a first weight of a first item and at 710, the process 700 may include receiving, from the first device, third data representing at least a second weight of a second item. For instance, the system may receive the second data, where the second data represents the first weight of the first item that was weighed using the station. In some instances, the system may then determine that the first item is "in-flight," where the first item may remain in-flight until the system identifies a user that removed the first item and/or associates the item with an account. Later, the system may receive the third data, where the third data represents the second weight of the second item placed within the tote. In some instances, the system may also receive first image data representing the first item being weighed using the station and/or second image data representing the second item being placed within the tote.

At 712, the process 700 may include determining a difference between the second weight and the first weight and at 714, the process 700 may include determining a probability that is based at least in part on the difference. For instance, the system may analyze the second data to determine the first weight and analyze the third data to determine the second weight. The system may then determine the difference between the second weight and the first weight. Additionally, the system may determine the probability that the second item is the first item based at least in part on the difference. As discussed above, the system may determine a greater probability when the difference is small and a smaller probability when the difference is large. For example, the system may determine that the probability is approximately 100% when the difference is zero and then decrease the probability as the difference increases greater than zero.

At 716, the process 700 may include determining that the second item is the first item based at least in part on the probability and at 718, the process 700 may include storing fourth data representing an identifier of the first item in association with the account. For instance, the system may use the probability to determine that the second item is the first item. In some instances, the system makes the determination based on the probability satisfying a threshold probability. In some instances, the system makes the determination based on the probability including the highest probability from all of the probabilities associated with in-flight items. In either instance, the system may then store the fourth data in association with the account. The fourth data may represent at least the identifier of the item, the first weight of the item, the price per unit weight of the item, and the total price of the item.

At 720, the process 700 may include determining that a session associated with the account is finished and at 722, the process 700 may include processing a transaction for a price of the first item. For instance, the system may determine that the session is finished. In some instances, the system makes the determination based on the system determining that the user exited the facility. In some instances, the system makes the determination based on the system receiving data, such as from the first device, that indicates that the session is finished. Based on determining that the session is finished, the system may then process the transaction for the price of the first item.

FIG. 8 is an example process 800 for using sensor data representing weights to identify an item within a facility. At 802, the process 800 may include receiving, from a first device associated with a first weight sensor, first data representing at least a first weight of a first item and at 804, the process 800 may include receiving, from a second device associated with a second weight sensor, second data representing at least a second weight of a second item. For instance, the system may receive the first data, where the first data represents the first weight of the first item that was weighed using the first weight sensor. In some instances, the first data may further represent a first time associated with the first weight sensor weighing the first item, a first location of the first weight sensor, and/or the like. Later, the system may receive the second data, where the second data represents the second weight of the second item that was weighed using the second weight sensor. In some instances, the second data may further represent a second time associated with the second weight sensor weighing the second item, a second location of the second weight sensor, and/or the like.

At 806, the process 800 may include determining a probability that the second item is the first item based at least in part on the first weight and the second weight. For instance, the system may determine a difference between the second weight and the first weight. The system may then determine the probability using at least the difference. In some instances, the system may determine the probability using additional information associated with the first item and the second item. For instance, the system may further determine the probability based on a time difference between when the first weight sensor weighed the first item and when the second weight sensor weighed the second item, a distance between the first weight sensor and the second weight sensor, identifying additional objects associated with the first item and/or the second item, and/or the like.

At 808, the process 800 may include determining whether the second item includes the first item. For instance, the system may determine whether the second item weighed using the second weight sensor is the same item as the first item weighed using the first weight sensor. The system may make the determination using the probability. For example, and in some instances, the system makes the determination based on the probability satisfying a threshold probability. Additionally, or alternatively, in some instances, the system makes the determination based on the probability including the highest probability from all of the probabilities associated with in-flight items.

If, at 808, it is determined that the second item includes the first item, then at 810, the process 800 may include associating the first item with an account. For instance, if the system determines that the second item includes the same item as the first item, then the system may associate the first item with the account. For example, the system may store data in association with the account, where the data represents at least an identifier associated with the first item, the first weight associated with the first item, the price per unit weight of the first item, the total price of the first item, and/or any other information associated with the first item. Additionally, the system may charge a user associated with the account for the total price of the first item.

However, if, at 808, it is determined that the second item does not include the first item, then at 812, the process 800 may include refraining from associating the first item with the account. For instance, if the system determines that the second item does not include the same item as the first item, then the system may refrain from associating the first item with the account. Additionally, in some instances, the system may perform additional processing to identify the second item. For example, the system may perform similar processes using one or more additional items that are currently in-flight to determine if the second item includes one of the other in-flight items.

FIG. 9 is an example process 900 for using information about items weighed using weight sensors in order to identify an item. At 902, the process 900 may include receiving first data representing first information associated with a first item weighed using a first weight sensor. For instance, the system may receive the first data representing the first information. The first information may include, but is not limited to, a first time that the first weight sensor weighed the first item, an identity of the first item, a first weight of the first item, a price per unit weight of the first item, a total price of the first item that is based on the first weight and the first price per unit weight, a first location of the first weight sensor, and/or any other information associated with the first item. In some instances, the system receives the first data from a first device associated with the first weight sensor.

At 904, the process 900 may include receiving second data representing second information associated with a second item weighed using a second weight sensor. For instance, the system may receive the second data representing the second information. The second information may include, but is not limited to, a second time that the second weight sensor weighed the second item, a second location of the second weight sensor, and/or any other information associated with the second item. In some instances, the system receives the second data from a second device associated with the second weight sensor. The second weight sensor may be included in a station, a tote, a checkout, and/or any other location within a facility.

At 906, the process 900 may include determining a probability based at least in part on the first information and the second information. For instance, the system may determine the probability using at least the first information and the second information. For example, the system may use the first information and the second information to determine a weight difference between the second weight and the first weight, a time difference between the second time and the first time, and/or a distance between the second weight sensor and the first weight sensor. The system may then determine the probability using the weight difference, the time difference, and/or the distance. In some instances, the system may further use additional sensor data, such as image data representing the first item being weighed using the first weight sensor and/or the second item being weighed using the second weight sensor, when determining the probability.

At 908, the process 900 may include determining, based at least in part on the probability, that the second item includes the first item and at 910, the process 900 may include associating the first item with an account. For instance, the system may use the probability to determine that the second item includes the first item. In some instances, the system makes the determination based on the probability satisfying a threshold probability. Additionally, or alternatively, in some instances, the system makes the determination based on the probability including the highest probability from all of the probabilities associated with in-flight items. In either instance, the system may associate the first item with the account.

Figure 10:
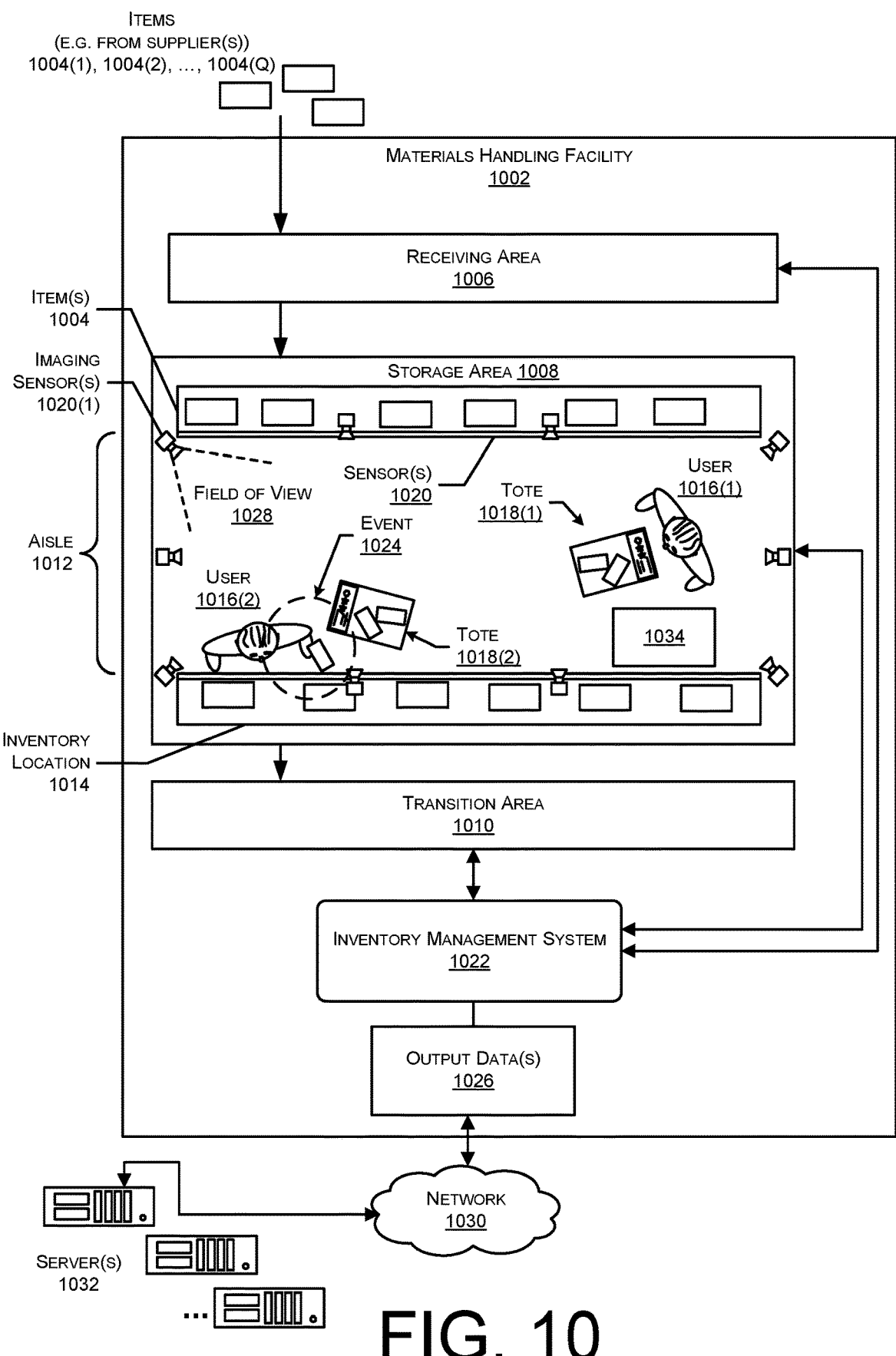
FIG. 10 is a block diagram of an example materials handling facility that includes sensors and an inventory management system configured to generate output regarding events occurring in the facility using the sensor data.

FIGS. 10 and 11 represent an illustrative materials handling environment, such as the materials handling facility 1002 (which may represent, and/or include, the facility 100), in which the techniques described herein may be applied to cameras monitoring the environments as described below. However, the following description is merely one illustrative example of an industry and environment in which the techniques described herein may be utilized. The materials handling facility 1002 (or "facility") comprises one or more physical structures or areas within which one or more items 1004(1), 1004(2), . . . , 1004(Q) (generally denoted as 1004) may be held. As used in this disclosure, letters in parentheses such as "(Q)" indicate an integer result. The items 1004 comprise physical goods, such as books, pharmaceuticals, repair parts, electronic gear, groceries, and so forth.

The facility 1002 may include one or more areas designated for different functions with regard to inventory handling. In this illustration, the facility 1002 includes a receiving area 1006, a storage area 1008, and a transition area 1010. The receiving area 1006 may be configured to accept items 1004, such as from suppliers, for intake into the facility 1002. For example, the receiving area 1006 may include a loading dock at which trucks or other freight conveyances unload the items 1004.

The storage area 1008 is configured to store the items 1004. The storage area 1008 may be arranged in various physical configurations. In one implementation, the storage area 1008 may include one or more aisles 1012. The aisle 1012 may be configured with, or defined by, inventory locations 1014 (which may represent, and/or include, the inventory locations 104) on one or both sides of the aisle 1012. The inventory locations 1014 may include one or more of shelves, racks, cases, cabinets, bins, floor locations, or other suitable storage mechanisms for holding or storing the items 1004. The inventory locations 1014 may be affixed to the floor or another portion of the facility's structure, or may be movable such that the arrangements of aisles 1012 may be reconfigurable. In some implementations, the inventory locations 1014 may be configured to move independently of an outside operator. For example, the inventory locations 1014 may comprise a rack with a power source and a motor, operable by a computing device to allow the rack to move from one location within the facility 1002 to another.

One or more users 1016(1), 1016(2) (generally denoted as 1016), totes 1018(1), 1018(2) (generally denoted as 1018) or other material handling apparatus may move within the facility 1002. For example, the users 1016 may move about within the facility 1002 to pick or place the items 1004 in various inventory locations 1014, placing them on the totes 1018 for ease of transport. An individual tote 1018 is configured to carry or otherwise transport one or more items 1004. For example, a tote 1018 may include a basket, a cart, a bag, and so forth. In other implementations, other agencies such as robots, forklifts, cranes, aerial drones, and so forth, may move about the facility 1002 picking, placing, or otherwise moving the items 1004.

One or more sensors 1020 (which may represent, and/or include, the sensors 106, the sensors 112, and/or the sensors 126 may be configured to acquire information in the facility 1002. The sensors 1020 in the facility 1002 may include sensors fixed in the environment (e.g., ceiling-mounted cameras) or otherwise, such as sensors in the possession of users (e.g., mobile phones, tablets, etc.). The sensors 1020 may include, but are not limited to, cameras 1020(1), weight sensors, radio frequency (RF) receivers, temperature sensors, humidity sensors, vibration sensors, and so forth. The sensors 1020 may be stationary or mobile, relative to the facility 1002. For example, the inventory locations 1014 may contain cameras 1020(1) configured to acquire images of pick or placement of items 1004 on shelves, of the users 1016(1) and 1016(2) in the facility 1002, and so forth. In another example, the floor of the facility 1002 may include weight sensors configured to determine a weight of the users 1016 or another object thereupon.

During operation of the facility 1002, the sensors 1020 may be configured to provide information suitable for tracking how objects move or other occurrences within the facility 1002. For example, a series of images acquired by a camera 1020(1) may indicate removal of an item 1004 from a particular inventory location 1014 by one of the users 1016 and placement of the item 1004 on or at least partially within one of the totes 1018.

While the storage area 1008 is depicted as having one or more aisles 1012, inventory locations 1014 storing the items 1004, sensors 1020, and so forth, it is understood that the receiving area 1006, the transition area 1010, or other areas of the facility 1002 may be similarly equipped. Furthermore, the arrangement of the various areas within the facility 1002 is depicted functionally rather than schematically. For example, multiple different receiving areas 1006, storage areas 1008, and transition areas 1010 may be interspersed rather than segregated in the facility 1002.

The facility 1002 may include, or be coupled to, an inventory management system 1022, which may perform some or all of the techniques described above with reference to FIGS. 1-9. For example, the inventory management system 1022 may maintain a virtual cart of each user within the facility. The inventory management system 1022 may also store a record associated with each user indicating the location of the user, and whether the user is eligible to exit the facility with one or more items without performing a manual checkout of the items. The inventory management system 1022 may also generate and output notification data to the users, indicating whether or not they are so eligible.

As illustrated, the inventory management system 1022 may reside at the facility 1002 (e.g., as part of on-premises servers), on the servers 1032 that are remote from the facility 1002, a combination thereof. In each instance, the inventory management system 1022 is configured to identify interactions and events with and between users 1016, devices such as sensors 1020, robots, material handling equipment, computing devices, and so forth, in one or more of the receiving area 1006, the storage area 1008, or the transition area 1010. As described above, some interactions may further indicate the existence of one or more events 1024, or predefined activities of interest. For example, events 1024 may include the entry of the user 1016 to the facility 1002, stocking of items 1004 at an inventory location 1014, picking of an item 1004 from an inventory location 1014, returning of an item 1004 to an inventory location 1014, placement of an item 1004 within a tote 1018, movement of users 1016 relative to one another, gestures by the users 1016, and so forth. Other events 1024 involving users 1016 may include the user 1016 providing authentication information in the facility 1002, using a computing device at the facility 1002 to authenticate the user to the inventory management system 1022, and so forth. Some events 1024 may involve one or more other objects within the facility 1002. For example, the event 1024 may comprise movement within the facility 1002 of an inventory location 1014, such as a counter mounted on wheels. Events 1024 may involve one or more of the sensors 1020. For example, a change in operation of a sensor 1020, such as a sensor failure, change in alignment, and so forth, may be designated as an event 1024. Continuing the example, movement of a camera 1020(1) resulting in a change in the orientation of the field of view 1028 (such as resulting from someone or something bumping the camera 1020(1)) may be designated as an event 1024.

By determining the occurrence of one or more of the events 1024, the inventory management system 1022 may generate output data 1026. The output data 1026 comprises information about the event 1024. For example, where the event 1024 comprises an item 1004 being removed from an inventory location 1014, the output data 1026 may comprise an item identifier indicative of the particular item 1004 that was removed from the inventory location 1014 and a user identifier of a user that removed the item.

The inventory management system 1022 may use one or more automated systems to generate the output data 1026. For example, an artificial neural network, one or more classifiers, or other automated machine learning techniques may be used to process the sensor data from the one or more sensors 1020 to generate output data 1026. For example, the inventory management system 1022 may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 1026 or the tentative results. The automated systems may generate confidence level data that provides information indicative of the accuracy or confidence that the output data 1026 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 910%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1004, user 1016, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level (e.g., probability) may be determined based at least in part on these differences. For example, the user 1016 may pick an item 1004(1) such as a perfume bottle that is generally cubical in shape from the inventory location 1014. Other items 1004 at nearby inventory locations 1014 may be predominantly spherical. Based on the difference in shape (cube vs. sphere) from the adjacent items, and the correspondence in shape with the previously stored image of the perfume bottle item 1004(1) (cubical and cubical), the confidence level that the user 102 has picked up the perfume bottle item 1004(1) is high.

In some situations, the automated techniques may be unable to generate output data 1026 with a confidence level above a threshold result. For example, the automated techniques may be unable to distinguish which user 1016 in a crowd of users 1016 has picked up the item 1004 from the inventory location 1014. In other situations, it may be desirable to provide human confirmation of the event 1024 or of the accuracy of the output data 1026. For example, some items 1004 may be deemed age restricted such that they are to be handled only by users 1016 above a minimum age threshold.

In instances where human confirmation is desired, sensor data associated with an event 1024 may be processed to generate inquiry data. The inquiry data may include a subset of the sensor data associated with the event 1024. The inquiry data may also include one or more of one or more tentative results as determined by the automated techniques, or supplemental data. The subset of the sensor data may be determined using information about the one or more sensors 1020. For example, camera data such as the location of the camera 1020(1) within the facility 1002, the orientation of the camera 1020(1), and a field of view 1028 of the camera 1020(1) may be used to determine if a particular location within the facility 1002 is within the field of view 1028. The subset of the sensor data may include images that may show the inventory location 1014 or that the item 1004 was stowed. The subset of the sensor data may also omit images from other cameras 1020(1) that did not have that inventory location 1014 in the field of view 1028. The field of view 1028 may comprise a portion of the scene in the facility 1002 that the sensor 1020 is able to generate sensor data about.

Continuing the example, the subset of the sensor data may comprise a video clip acquired by one or more cameras 1020(1) having a field of view 1028 that includes the item 1004. The tentative results may comprise the "best guess" as to which items 1004 may have been involved in the event 1024. For example, the tentative results may comprise results determined by the automated system that have a confidence level above a minimum threshold.

The facility 1002 may be configured to receive different kinds of items 1004 from various suppliers and to store them until a customer orders or retrieves one or more of the items 1004. A general flow of items 1004 through the facility 1002 is indicated by the arrows of FIG. 10. Specifically, as illustrated in this example, items 1004 may be received from one or more suppliers, such as manufacturers, distributors, wholesalers, and so forth, at the receiving area 1006. In various implementations, the items 1004 may include merchandise, commodities, perishables, or any suitable type of item 1004, depending on the nature of the enterprise that operates the facility 1002. The receiving of the items 1004 may comprise one or more events 1024 for which the inventory management system 1022 may generate output data 1026.

Upon being received from a supplier at receiving area 1006, the items 1004 may be prepared for storage. For example, items 1004 may be unpacked or otherwise rearranged. The inventory management system 1022 may include one or more software applications executing on a computer system to provide inventory management functions based on the events 1024 associated with the unpacking or rearrangement. These inventory management functions may include maintaining information indicative of the type, quantity, condition, cost, location, weight, or any other suitable parameters with respect to the items 1004. The items 1004 may be stocked, managed, or dispensed in terms of countable, individual units or multiples, such as packages, cartons, crates, pallets, or other suitable aggregations. Alternatively, some items 1004, such as bulk products, commodities, and so forth, may be stored in continuous or arbitrarily divisible amounts that may not be inherently organized into countable units. Such items 1004 may be managed in terms of measurable quantity such as units of length, area, volume, weight, time, duration, or other dimensional properties characterized by units of measurement. Generally speaking, a quantity of an item 1004 may refer to either a countable number of individual or aggregate units of an item 1004 or a measurable amount of an item 1004, as appropriate.

After arriving through the receiving area 1006, items 1004 may be stored within the storage area 1008. In some implementations, like items 1004 may be stored or displayed together in the inventory locations 1014 such as in bins, on shelves, hanging from pegboards, and so forth. In this implementation, all items 1004 of a given kind are stored in one inventory location 1014. In other implementations, like items 1004 may be stored in different inventory locations 1014. For example, to optimize retrieval of certain items 1004 having frequent turnover within a large physical facility 1002, those items 1004 may be stored in several different inventory locations 1014 to reduce congestion that might occur at a single inventory location 1014. Storage of the items 1004 and their respective inventory locations 1014 may comprise one or more events 1024.

When a customer order specifying one or more items 1004 is received, or as a user 1016 progresses through the facility 1002, the corresponding items 1004 may be selected or "picked" from the inventory locations 1014 containing those items 1004. In various implementations, item picking may range from manual to completely automated picking. For example, in one implementation, a user 1016 may have a list of items 1004 they desire and may progress through the facility 1002 picking items 1004 from inventory locations 1014 within the storage area 1008, and placing those items 1004 into a tote 1018. In other implementations, employees of the facility 1002 may pick items 1004 using written or electronic pick lists derived from customer orders. These picked items 1004 may be placed into the tote 1018 as the employee progresses through the facility 1002. Picking may comprise one or more events 1024, such as the user 1016 in moving to the inventory location 1014, retrieval of the item 1004 from the inventory location 1014, and so forth.

After items 1004 have been picked, they may be processed at a transition area 1010. The transition area 1010 may be any designated area within the facility 1002 where items 1004 are transitioned from one location to another or from one entity to another. For example, the transition area 1010 may be a packing station within the facility 1002. When the item 1004 arrives at the transition area 1010, the items 1004 may be transitioned from the storage area 1008 to the packing station. The transitioning may comprise one or more events 1024. Information about the transition may be maintained by the inventory management system 1022 using the output data 1026 associated with those events 1024.

In another example, if the items 1004 are departing the facility 1002 a list of the items 1004 may be obtained and used by the inventory management system 1022 to transition responsibility for, or custody of, the items 1004 from the facility 1002 to another entity. For example, a carrier may accept the items 1004 for transport with that carrier accepting responsibility for the items 1004 indicated in the list. In another example, a customer may purchase or rent the items 1004 and remove the items 1004 from the facility 1002. The purchase or rental may comprise one or more events 1024.

The inventory management system 1022 may access or generate sensor data about the facility 1002 and the contents therein including the items 1004, the users 1016, the totes 1018, and so forth. The sensor data may be acquired by one or more of the sensors 1020, data provided by other systems, and so forth. For example, the sensors 1020 may include cameras 1020(1) configured to acquire image data of scenes in the facility 1002. The image data may comprise still images, video, or a combination thereof. The image data may be processed by the inventory management system 1022 to determine a location of the user 1016, the tote 1018, the identifier of the user 1016, and so forth. As used herein, the identity of the user may represent a unique identifier of the user (e.g., name, number associated with user, username, etc.), an identifier that distinguishes the user amongst other users being located within the environment, or the like.

The inventory management system 1022, or systems coupled thereto, may be configured to associate an account with the user 1016, as well as to determine other candidate users. An account of the user 1016 may be determined before, during, or after entry to the facility 1002.

In some instances, the inventory management system 1022 groups users within the facility into respective sessions. That is, the inventory management system 1022 may utilize the sensor data to determine groups of users that are effectively "together" (e.g., shopping together). In some instances, a particular session may include multiple users that entered the facility 1002 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in her tote 1018. Noting the child and the mother as belonging to the same session may increase the chances of successfully adding the box of cereal to the virtual shopping cart of the mother.

By determining the occurrence of one or more events 1024 and the output data 1026 associated therewith, the inventory management system 1022 is able to provide one or more services to the users 1016 of the facility 1002. By utilizing one or more facility associates to process inquiry data and generate response data that may then be used to produce output data 1026, overall accuracy of the system may be enhanced. The enhanced accuracy may improve the user experience of the one or more users 1016 of the facility 1002. In some examples, the output data 1026 may be transmitted over a network 1030 to one or more servers 1032.

As further illustrated in FIG. 10, the facility 1002 may include one or more stations 1034 (although one is only illustrated for clarity reasons) that the users 1016 may use for items that are priced per unit weight. The station 1034 may include an electronic device (e.g., the electronic device 502) and a weight sensor (e.g., the weight sensor 522). In some instances, the station 1034 may represent, and/or may include, one or more of the stations 108.

FIG. 11 illustrates a block diagram of the one or more servers 1032. The servers 1032 may be physically present at the facility 1002, may be accessible by the network 1030, or a combination of both. The servers 1032 do not require end-user knowledge of the physical location and configuration of the system that delivers the services. Common expressions associated with the servers 1032 may include "on-demand computing," "software as a service (SaaS)," "cloud services," "data centers," and so forth. Services provided by the servers 1032 may be distributed across one or more physical or virtual devices.

The servers 1032 may include one or more hardware processors 1102 (processors) configured to execute one or more stored instructions. The processors 1102 may comprise one or more cores. The servers 1032 may include one or more input/output (I/O) interface(s) 1104 to allow the processor 1102 or other portions of the servers 1032 to communicate with other devices. The I/O interfaces 1104 may comprise Inter-Integrated Circuit (I2C), Serial Peripheral Interface bus (SPI), Universal Serial Bus (USB) as promulgated by the USB Implementers Forum, and so forth.

The servers 1032 may also include one or more communication interfaces 1108. The communication interfaces 1108 are configured to provide communications between the servers 1032 and other devices, such as the sensors 1020, the interface devices, routers, and so forth. The communication interfaces 1108 may include devices configured to couple to personal area networks (PANs), wired and wireless local area networks (LANs), wired and wireless wide area networks (WANs), and so forth. For example, the communication interfaces 1108 may include devices compatible with Ethernet, Wi-Fi™, and so forth. The servers 1032 may also include one or more busses or other internal communications hardware or software that allow for the transfer of data between the various modules and components of the servers 1032.

The servers 1032 may also include a power supply 1140. The power supply 1140 is configured to provide electrical power suitable for operating the components in the servers 1032.

The servers 1032 may further include one or more memories 1110. The memory 1110 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1110 provides storage of computer-readable instructions, data structures, program modules, and other data for the operation of the servers 1032. A few example functional modules are shown stored in the memory 1110, although the same functionality may alternatively be implemented in hardware, firmware, or as a system on a chip (SOC).

The memory 1110 may include at least one operating system (OS) component 1112. The OS component 1112 is configured to manage hardware resource devices such as the I/O interfaces 1104, the communication interfaces 1108, and provide various services to applications or components executing on the processors 1102. The OS component 1112 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 1110. These components may be executed as foreground applications, background tasks, daemons, and so forth. The memory 1110 may include an operating system 1112. Also, a communication component 1114 may be configured to establish communications with one or more of the sensors 1020, one or more of the devices used by associates, other servers 1032, or other devices. The communications may be authenticated, encrypted, and so forth.

The memory 1110 may store an inventory management system 1116. The inventory management system 1116 is configured to provide the inventory functions as described herein with regard to the inventory management system 1022. For example, the inventory management system 1116 may track movement of items 1004 in the facility 1002, generate user interface data, and so forth.

The inventory management system 1116 may access information stored in one or more data stores 1118 in the memory 1110. The data store 1118 may use a flat file, database, linked list, tree, executable code, script, or other data structure to store the information. In some implementations, the data store 1118 or a portion of the data store 1118 may be distributed across one or more other devices including other servers 1032, network attached storage devices, and so forth.

The data store 1118 may include physical layout data 1120. The physical layout data 1120 provides a mapping of physical locations within the physical layout of devices and objects such as the sensors 1020, inventory locations 1014, and so forth. The physical layout data 1120 may indicate the coordinates within the facility 1002 of an inventory location 1014, sensors 1020 within view of that inventory location 1014, and so forth. For example, the physical layout data 1120 may include camera data comprising one or more of a location within the facility 1002 of a camera 1020(1), orientation of the camera 1020(1), the operational status, and so forth. Continuing example, the physical layout data 1120 may indicate the coordinates of the camera 1020(1), pan and tilt information indicative of a direction that the field of view 1028 is oriented along, whether the camera 1020(1) is operating or malfunctioning, and so forth.

In some implementations, the inventory management system 1116 may access the physical layout data 1120 to determine if a location associated with the event 1024 is within the field of view 1028 of one or more sensors 1020. Continuing the example above, given the location within the facility 1002 of the event 1024 and the camera data, the inventory management system 1116 may determine the cameras 1020(1) that may have generated images of the event 1024.

The item data 1122 (which may include the item data 518) comprises information associated with the items 1004. The information may include information indicative of one or more inventory locations 1014 at which one or more of the items 1004 are stored. The item data 1122 may also include order data, SKU or other product identifier, price, quantity on hand, weight, expiration date, images of the item 1004, detail description information, ratings, ranking, and so forth. The inventory management system 1116 may store information associated with inventory management functions in the item data 1122.

The data store 1118 may also include sensor data 1124. The sensor data 1124 comprises information acquired from, or based on, the one or more sensors 1020. For example, the sensor data 1124 may comprise 3D information about an object in the facility 1002. As described above, the sensors 1020 may include a camera 1020(1), which is configured to acquire one or more images. These images may be stored as the image data 1126. The image data 1126 may comprise information descriptive of a plurality of picture elements or pixels. Non-image data 1128 may comprise information from other sensors 1020, such as input from microphones, weight sensors, and so forth.

User data 1130 may also be stored in the data store 1118. The user data 1130 may include identity data, information indicative of a profile, purchase history, location data, and so forth. Individual users 1016 or groups of users 1016 may selectively provide user data 1130 for use by the inventory management system 1022. The individual users 1016 or groups of users 1016 may also authorize collection of the user data 1130 during use of the facility 1002 or access to user data 1130 obtained from other systems. For example, the user 1016 may opt-in to collection of the user data 1130 to receive enhanced services while using the facility 1002.

In some implementations, the user data 1130 may include information designating a user 1016 for special handling. For example, the user data 1130 may indicate that a particular user 1016 has been associated with an increased number of errors with respect to output data 1026. The inventory management system 1116 may be configured to use this information to apply additional scrutiny to the events 1024 associated with this user 1016. For example, events 1024 that include an item 1004 having a cost or result above the threshold amount may be provided to a facility associate for processing regardless of the determined level of confidence in the output data 1026 as generated by the automated system.

The inventory management system 1116 may include one or more of a location component 1132, identification component 1134, event-determination component 1136, and inquiry component 1138, potentially amongst other components 1156.

The location component 1132 functions to locate items or users within the environment of the facility to allow the inventory management system 1116 to assign certain events to the correct users. That is, the location component 1132 may assign unique identifiers to users as they enter the facility and, with the users' consent, may locate the users throughout the facility 1002 over the time they remain in the facility 1002. The location component 1132 may perform this locating using sensor data 1124, such as the image data 1126. For example, the location component 1132 may receive the image data 1126 identify an account of a user using the image data 1126.

Therefore, upon receiving the indication of the time and location of the event in question, the location component 1132 may query the data store 1118 to determine which one or more users were at or within a threshold distance of the location of the event at the particular time of the event. Further, the location component 1132 may assign different confidence levels (e.g., probabilities) to different users, with the confidence levels indicating how likely it is that each corresponding user is the user that is in fact associated with the event of interest.

The location component 1132 may access the sensor data 1124 in order to determine this location data of the user and/or items. The location data provides information indicative of a location of an object, such as the item 1004, the user 1016, the tote 1018, and so forth. The location may be absolute with respect to the facility 1002 or relative to another object or point of reference. Absolute terms may comprise a latitude, longitude, and altitude with respect to a geodetic reference point. Relative terms may include a location of 210.4 meters (m) along an x-axis and 710.2 m along a y-axis as designated by a floor plan of the facility 1002, 10.2 m from an inventory location 1014 along a heading of 169°, and so forth. For example, the location data may indicate that the user 1016(1) is 210.2 m along the aisle 1012(1) and standing in front of the inventory location 1014. In comparison, a relative location may indicate that the user 1016(1) is 32 cm from the tote 1018 at a heading of 730 with respect to the tote 1018. The location data may include orientation information, such as which direction the user 1016 is facing. The orientation may be determined by the relative direction the user's 1016 body is facing. In some implementations, the orientation may be relative to the interface device. Continuing the example, the location data may indicate that the user 1016(1) is oriented with a heading of 0°, or looking north. In another example, the location data may indicate that the user 1016 is facing towards the interface device.

The identification component 1134 is configured to identify an object. In one implementation, the identification component 1134 may be configured to identify an item 1004 (e.g., using any of the processes described herein). In another implementation, the identification component 1134 may be configured to identify the user 1016. For example, the identification component 1134 may use facial recognition techniques to process the image data 1126 and determine the user 1016 depicted in the images by comparing the characteristics in the image data 1126 with previously stored results. The identification component 1134 may also access data from other sensors 1020, such as from an RFID reader, an RF receiver, and so forth.

The event-determination component 1136 is configured to process the sensor data 1124 and generate output data 1026, and may include components described above. The event-determination component 1136 may access information stored in the data store 1118 including, but not limited to, event-description data 1142, confidence levels 1144, or threshold values 1146 (e.g., threshold probability). In some instances, the event-determination component 1136 may be configured to perform some or all of the techniques described above with regards to the event-determination component 1136. For instance, the event-determination component 1136 may be configured to create and utilize event classifiers for identifying events (e.g., predefined activity) within image data, potentially without use of other sensor data acquired by other sensors in the environment.

The event-description data 1142 comprises information indicative of one or more events 1024. For example, the event-description data 1142 may comprise predefined profiles that designate movement of an item 1004 from an inventory location 1014 with the event 1024 of "pick". The event-description data 1142 may be manually generated or automatically generated. The event-description data 1142 may include data indicative of triggers associated with events occurring in the facility 1002. An event may be determined as occurring upon detection of the trigger. For example, sensor data 1124 such as a change in weight from a weight sensor 1020 at an inventory location 1014 may trigger detection of an event of an item 1004 being added or removed from the inventory location 1014. In another example, the trigger may comprise an image of the user 1016 reaching a hand toward the inventory location 1014. In yet another example, the trigger may comprise two or more users 1016 approaching to within a threshold distance of one another.

The event-determination component 1136 may process the sensor data 1124 using one or more techniques including, but not limited to, artificial neural networks, classifiers, decision trees, support vector machines, Bayesian networks, and so forth. For example, the event-determination component 1136 may use a decision tree to determine occurrence of the "pick" event 1024 based on sensor data 1124. The event-determination component 1136 may further use the sensor data 1124 to determine one or more tentative results 1148. The one or more tentative results 1148 comprise data associated with the event 1024. For example, where the event 1024 comprises a disambiguation of users 1016, the tentative results 1148 may comprise a list of possible user 1016 identities. In another example, where the event 1024 comprises a disambiguation between items, the tentative results 1148 may comprise a list of possible item identifiers. In some implementations, the tentative result 1148 may indicate the possible action. For example, the action may comprise the user 1016 picking, placing, moving an item 1004, damaging an item 1004, providing gestural input, and so forth.

In some implementations, the tentative results 1148 may be generated by other components. For example, the tentative results 1148 such as one or more possible identities or locations of the user 1016 involved in the event 1024 may be generated by the location component 1132. In another example, the tentative results 1148 such as possible items 1004 that may have been involved in the event 1024 may be generated by the identification component 1134.

The event-determination component 1136 may be configured to provide a confidence level 1144 associated with the determination of the tentative results 1148. The confidence level 1144 provides indicia as to the expected level of accuracy of the tentative result 1148. For example, a low confidence level 1144 may indicate that the tentative result 1148 has a low probability of corresponding to the actual circumstances of the event 1024. In comparison, a high confidence level 1144 may indicate that the tentative result 1148 has a high probability of corresponding to the actual circumstances of the event 1024.

In some implementations, the tentative results 1148 having confidence levels 1144 that exceed the threshold may be deemed to be sufficiently accurate and thus may be used as the output data 1156. For example, the event-determination component 1136 may provide tentative results 1148 indicative of the three possible items 1004(1), 1004(2), and 1004(3) corresponding to the "pick" event 1024. The confidence levels 1144 associated with the possible items 1004 (1), 1004(2), and 1004(3) may be 210%, 70%, 92%, respectively. Continuing the example, the threshold value 1146 may be set such that confidence level 1144 of 90% are deemed to be sufficiently accurate. As a result, the event-determination component 1136 may designate the "pick" event 1024 as involving item 1004(3).

The inquiry component 1138 may be configured to use at least a portion of the sensor data 1124 associated with the event 1024 to generate inquiry data 11100. In some implementations, the inquiry data 11100 may include one or more of the tentative results 1148 or supplemental data 11102. The inquiry component 1138 may be configured to provide inquiry data 11100 to one or more devices associated with one or more human associates.

An associate user interface is presented on the respective devices of associates. The associate may generate response data 11104 by selecting a particular tentative result 1148, entering new information, indicating that they are unable to answer the inquiry, and so forth.

The supplemental data 1152 comprises information associated with the event 1024 or that may be useful in interpreting the sensor data 1124. For example, the supplemental data 1152 may comprise previously stored images of the items 1004. In another example, the supplemental data 1152 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1126 during presentation to an associate.

The inquiry component 1138 processes the response data 1154 provided by the one or more associates. The processing may include calculating one or more statistical results associated with the response data 1154. For example, statistical results may include a count of the number of times associates selected a particular tentative result 1148, determination of a percentage of the associates that selected a particular tentative result 1148, and so forth.

The inquiry component 1138 is configured to generate the output data 1156 based at least in part on the response data 1154. For example, given that a majority of the associates returned response data 1154 indicating that the item 1004 associated with the "pick" event 1024 is item 1004(10), the output data 1026 may indicate that the item 1004(10) was picked.

The inquiry component 1138 may be configured to selectively distribute inquiries to particular associates. For example, some associates may be better suited to answering particular types of inquiries. Performance data, such as statistical data about the performance of the associates, may be determined by the inquiry component 1138 from the response data 1154 provided by the associates. For example, information indicative of a percentage of different inquiries in which the particular associate selected response data 1154 that disagreed with the majority of associates may be maintained. In some implementations, test or practice inquiry data 1150 having a previously known correct answer may be provided to the associate for training or quality assurance purposes. The determination of the set of associates to use may be based at least in part on the performance data.

By using the inquiry component 1138, the event-determination component 1136 may be able to provide high reliability output data 1156 that accurately represents the event 1024. The output data 1156 generated by the inquiry component 1138 from the response data 1154 may also be used to further train the automated systems used by the inventory management system 1116. For example, the sensor data 1124 and the output data 1156, based on response data 1154, may be provided to one or more of the components of the inventory management system 1116 for training in process improvement. Continuing the example, this information may be provided to an artificial neural network, Bayesian network, and so forth, to further train these systems such that the confidence level 1144 and the tentative results 1148 produced in the future for the same or similar input is improved. Finally, as FIG. 11 illustrates, the servers 1032 may store and/or utilize other data 1158.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
   one or more processors; and
   one or more computer-readable media storing instructions that, when executed by the one or more processors, cause the one or more processors to perform operations comprising:
      receiving account identification data generated by a first device associated with a shopping cart;
      determining an account associated with a user based at least in part on the account identification data;
      associating the shopping cart with the account;
      receiving, from a second device that is associated with an inventory location, first sensor data received from a first weight sensor associated with the inventory location that represents a first weight of a first item removed from the inventory location;
      receiving, from a third device associated with a first scale, order data representing at least:
         an identifier associated with a second item placed on the first scale;
         a second weight of the second item; and
         a price of the second item that is based at least in part on the second weight;
      receiving, from the first device associated with the shopping cart, second sensor data from a second scale associated with the shopping cart that represents a third weight of a third item placed within the shopping cart;
      determining a first location associated with the first scale;
      determining a second location associated with the second scale associated with the shopping cart;
      determining weight differences between the second weight of the second item, the first weight of the first item, and the third weight of the third item;
      determining a probability that the second item that was placed in the shopping cart and the second item that was placed on the first scale are the first item removed from the inventory location based at least in part on the weight differences;
      determining that the probability satisfies a threshold probability;

based at least in part on determining the first location, determining the second location, and determining that the probability satisfies the threshold probability, determining that the second item that was placed on the first scale and that was placed in the shopping cart includes the first item that was removed from the inventory location;

storing at least a portion of the order data in association with the account of the user;

determining that the user has exited the facility; and based at least in part on determining that the user has exited the facility, charging a payment instrument associated with the account for at least a price of the first item.

2. The system as recited in claim 1, the operations further comprising:

determining a first time that the second item was on the first scale;

determining a second time that the third item was placed within the shopping cart; and determining a time difference between the second time and the first time, and wherein determining the probability is further based at least in part on the time difference.

3. The system as recited in claim 1, the operations further comprising:

determining the second location associated with the second scale associated with the shopping cart at a time when the third item was placed within the shopping cart; and determining a distance between the second location and the first location, and wherein determining the probability is further based at least in part on the distance.

4. A method comprising:

receiving, at a first computing device and from a second computing device associated with an inventory location, first sensor data from a first weight sensor associated with the inventory location, wherein the first sensor data represents a first weight of a first item removed from the inventory location;

determining, by a third computing device associated with a station for weighing items priced per unit weight and including a second weight sensor, second sensor data representing at least:

an identifier associated with a second item that was placed on the second weight sensor;

a second weight of the second item that was placed on the second weight sensor; and a price of the second item that is based on the second weight;

receiving, at the first computing device and from the third computing device, the second sensor data;

receiving, at the first computing device and from a fourth computing device of a mobile cart that includes a third weight sensor, account identification data generated by the fourth computing device for associating the mobile cart with an account associated with a user;

receiving, at the first computing device and from the fourth computing device, third sensor data representing a third weight of a third item that was placed within the mobile cart and on the third weight sensor;

determining a first location associated with the first weight sensor;

determining a second location associated with the second weight sensor;

determining weight differences between the third weight of the third item, the second weight of the second item, and the first weight of the first item;

determining a probability that the second item that was placed on the first weight sensor and the third item that was placed within the mobile cart corresponds to the first item that was removed from the inventory location based at least in part on the weight differences;

determining that the probability satisfies a threshold probability;

based at least in part on determining the first location, determining the second location, and determining that the probability satisfies the threshold probability, determining, by the first computing device, that the second item that was placed on the first weight sensor and the third item that was placed within the mobile cart corresponds to the first item that was removed from the inventory location; and based at least in part on determining that the second item and the third item correspond to the first item, storing, by the first computing device, event data associated with the account, the event data indicating at least the identifier associated with the second item and the price.

5. The system as recited in claim 1, wherein the third device is associated with a station for weighing items priced per unit weight, the station including the first scale.

6. The method as recited in claim 4, further comprising:

identifying a fourth item that was placed on the second weight sensor;

receiving, from the third computing device, fourth sensor data representing a fourth weight of the fourth item;

determining a second price of the fourth item that is based at least in part on the fourth weight;

determining a first difference between the second weight and the third weight;

determining a second difference between the second weight and the fourth weight; and determining that the first difference is less than the second difference, and wherein determining that the second item and the third item correspond to the first item is based at least in part on the first difference being less than the second difference.

7. The method as recited in claim 4, further comprising:

identifying a fourth item that was placed on a fourth weight sensor;

receiving, from a fourth device that is associated with the fourth weight sensor, fourth sensor data representing a fourth weight of the fourth item;

determining a second price of the fourth item that is based at least in part on the fourth weight;

determining a first difference between the second weight and the third weight;

determining a second difference between the second weight and the fourth weight; and determining that the first difference is less than the second difference, and wherein determining that the second item and the third item correspond to the first item is based at least in part on the first difference being less than the second difference.

8. The method as recited in claim 4, further comprising:

receiving, from a first imaging device, first image data representing an area that includes the second weight sensor;

analyzing the first image data to determine one or more first characteristics associated with a first package that was placed on the second weight sensor at a first time that the second weight sensor weighed the second item;

receiving, from a second imaging device, second image data representing an area that includes the third weight sensor; and analyzing the second image data to determine one or more second characteristics associated with a second package that was placed on the third weight sensor at a second time that the third weight sensor weighed the third item, and wherein determining that the second item and the third item correspond to the first item is further based at least in part on the one or more first characteristics and the one or more second characteristics.

9. The method as recited in claim 4, further comprising:

determining a first time that the second item was placed on the second weight sensor; and determining a second time that the third item was placed within the mobile cart and on the third weight sensor, and wherein determining that the second item and the third item correspond to the first item is further based at least in part on the first time and the second time.

10. The method as recited in claim 9, further comprising:

determining a first difference between the second weight and the third weight;

determining a second difference between the second time and the first time;

and wherein determining that the probability that the second item and the third item correspond to the first item is further based at least in part on the first difference and the second difference.

11. The method as recited in claim 4, further comprising:

determining a first difference between the second weight and the third weight;

determining a second difference between the second location and the first location;

and wherein determining that the probability that the second item and the third item correspond to the first item is further based at least in part on the first difference and the second difference.

12. The method as recited in claim 4, further comprising:

determining the account is associated with the user based at least in part on the account identification data;

associating the mobile cart with the account; and based at least in part on determining that the second item and the third item correspond to the first item, determining that the first item was placed within the mobile cart, and wherein storing the event data associated with the account is based at least in part on determining that the first item was placed within the mobile cart.

13. The method as recited in claim 4, wherein:

the weight differences include a difference between the second weight and the first weight;

determining the probability that the third item corresponds to the first item is based at least in part on the difference; and determining that the second item and the third item correspond to the first item is based at least in part on the difference.

14. The method as recited in claim 4, further comprising:

determining a first time that the first item was removed from the inventory location; and determining a second time that the second item was placed on the second weight sensor, and wherein determining that the second item and the third item correspond to the first item is further based at least in part on the first time and the second time.

15. The method as recited in claim 4, further comprising:

receiving, from a first imaging device, first image data representing a first area that includes the inventory location associated with the first item;

analyzing the first image data to determine that the first item was placed within a package;

receiving, from a second imaging device, second image data representing a second area that includes the second weight sensor; and analyzing the second image data to determine that the package was placed on the second weight sensor, and wherein identifying the first item that was placed on the second weigh sensor is based at least in part on determining the second image data represents that the package was placed on the second weight sensor.

16. A method comprising:

identifying, by a first computing device, a first item that was removed from an inventory location based on first sensor data;

receiving, at the first computing device and from a first weight sensor that is associated with the inventory location, first weight data representing a first weight of the first item;

receiving, at the first computing device and from a second computing device that is separate from the inventory location and is associated with a second weight sensor, second weight data representing a second weight of a second item that was placed on the second weight sensor;

receiving, at the first computing device and from a third computing device that is associated with a tote that includes a third weight sensor, account identification data generated by the third computing device for associating the tote with an account associated with a user;

receiving, at the first computing device and from the third computing device, third weight data representing a third weight of a third item that was placed within the tote;

determining, by the first computing device, that the second item corresponds to the first item based at least in part on the first weight and the second weight;

determining a first location associated with the second weight sensor;

determining a second location associated with the third weight sensor;

determining a weight difference between the third weight of the third item and the second weight of the second item;

determining a probability that the third item that was placed within the tote corresponds to the second item that was placed on the second weight sensor based at least in part on the weight difference;

determining that the probability satisfies a threshold probability;

based at least in part on determining the first location, determining the second location, and determining that the probability satisfies the threshold probability, determining, by the first computing device, that the third item that was placed within the tote corresponds to the second item that was placed on the second weight sensor; and based at least in part on determining that the third item corresponds to the second item, determining, by the first computing device, event data associated with the account, the event data indicating at least a price of the first item that is based at least in part on the second weight.

17. The method as recited in claim 16, further comprising:

the event data further indicating at least an identifier associated with the first item and the price.

18. The method as recited in claim 16, further comprising:

determining, by the first computing device, a difference between the second weight and the first weight;

determining, by the first computing device, a second probability that the second item corresponds to the first item based at least in part on the difference; and determining, by the first computing device, that the second probability satisfies a second threshold probability, and wherein determining that the second item corresponds to the first item is based at least in part on determining that the second probability satisfies the second threshold probability.

19. The method as recited in claim 16, wherein the second computing device is associated with a station for weighing items priced per unit weight, the station including the second weight sensor.

* * * * *